US012344006B2

(12) United States Patent
Nakano et al.

(10) Patent No.: US 12,344,006 B2
(45) Date of Patent: Jul. 1, 2025

(54) PRINTING APPARATUS AND METHOD OF CONTROLLING PRINTING APPARATUS

(71) Applicant: CANON KABUSHIKI KAISHA, Tokyo (JP)

(72) Inventors: Takatoshi Nakano, Yokohama (JP); Yoshinori Nakagawa, Kawasaki (JP); Atsushi Takahashi, Tama (JP); Takuya Fukasawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 17/986,003

(22) Filed: Nov. 14, 2022

(65) Prior Publication Data

US 2023/0071122 A1 Mar. 9, 2023

Related U.S. Application Data

(63) Continuation of application No. 17/082,054, filed on Oct. 28, 2020, now Pat. No. 11,529,814, which is a (Continued)

(30) Foreign Application Priority Data

Oct. 5, 2018 (JP) ................................ 2018-189939

(51) Int. Cl.
*B41J 2/18* (2006.01)
*B41J 2/21* (2006.01)

(52) U.S. Cl.
CPC ............... *B41J 2/18* (2013.01); *B41J 2/2103* (2013.01)

(58) Field of Classification Search
CPC ................................. B41J 2/18; B41J 2/2103
See application file for complete search history.

(56) References Cited

U.S. PATENT DOCUMENTS 7,410,239 B2 8/2008 Takahashi et al.
7,537,661 B2 5/2009 Nakagawa et al.
(Continued)

FOREIGN PATENT DOCUMENTS

CN 108454242 A 8/2018
EP 3219495 A1 9/2017
(Continued)

OTHER PUBLICATIONS

Mar. 13, 2020 European Search Report in European Patent Appln. No. 19200810.0.
(Continued)

*Primary Examiner* — Jason S Uhlenhake
(74) *Attorney, Agent, or Firm* — Venable LLP

(57) ABSTRACT

A printing apparatus comprises: a print head comprising, for each of a plurality of types of inks, an ejection opening and pressure chamber, and configured to perform printing operation by ejecting the ink from the ejection opening; a circulation unit capable of circulating the ink of each ink type; a determination unit configured to determine an accumulated time for which a first type of ink is circulated by the circulation unit in the printing operation using the first type of ink and not using a second type of ink different from the first type of ink; and a control unit configured to perform control based on the determined accumulated time to cause the circulation unit to circulate at least the second type of ink among the plurality of types of inks in a case where the accumulated time is longer than a predetermined time.

25 Claims, 13 Drawing Sheets

Related U.S. Application Data continuation of application No. 16/589,333, filed on Oct. 1, 2019, now Pat. No. 10,850,529.

(56) References Cited

U.S. PATENT DOCUMENTS

| | | | |
|---|---|---|---|
| 7,591,545 | B2 | 9/2009 | Iwasaki et al. |
| 7,604,344 | B2 | 10/2009 | Seki et al. |
| 7,614,714 | B2 | 11/2009 | Masuyama et al. |
| 7,669,989 | B2 | 3/2010 | Oshio et al. |
| 7,850,273 | B2 | 12/2010 | Yasutani et al. |
| 7,891,796 | B2 | 2/2011 | Masuyama et al. |
| 7,963,245 | B2 | 6/2011 | Oshio et al. |
| 8,001,921 | B2 | 8/2011 | Oshio et al. |
| 8,079,659 | B2 | 12/2011 | Tajika et al. |
| 8,079,665 | B2 | 12/2011 | Takahashi et al. |
| 8,186,783 | B2 | 5/2012 | Yasutani et al. |
| 8,205,982 | B2 | 6/2012 | Masuyama et al. |
| 8,210,637 | B2 | 7/2012 | Masuyama et al. |
| 8,240,802 | B2 | 8/2012 | Nakano et al. |
| 8,251,479 | B2 | 8/2012 | Seki et al. |
| 8,251,482 | B1 | 8/2012 | Yasutani et al. |
| 8,328,311 | B2 | 12/2012 | Nakano et al. |
| 8,366,230 | B2 | 2/2013 | Taira et al. |
| 8,371,673 | B2 | 2/2013 | Maru et al. |
| 8,371,677 | B2 | 2/2013 | Fukasawa |
| 8,439,472 | B2 | 5/2013 | Yasutani et al. |
| 8,485,620 | B2 | 7/2013 | Kitabatake et al. |
| 8,511,787 | B2 | 8/2013 | Yasutani et al. |
| 8,651,616 | B2 | 2/2014 | Maru et al. |
| 8,671,880 | B2 | 3/2014 | Oshio et al. |
| 8,727,519 | B2 | 5/2014 | Nakagawa et al. |
| 8,845,060 | B2 | 9/2014 | Azuma et al. |
| 8,876,280 | B2 | 11/2014 | Ishikawa et al. |
| 8,915,579 | B2 | 12/2014 | Hamasaki et al. |
| 8,950,844 | B2 | 2/2015 | Takahashi et al. |
| 9,004,640 | B2 | 4/2015 | Ishikawa et al. |
| 9,278,552 | B2 | 3/2016 | Teshigawara et al. |
| 9,415,960 | B2 | 8/2016 | Asano et al. |
| 9,434,196 | B2 | 9/2016 | Fukasawa et al. |
| 9,457,590 | B2 | 10/2016 | Koizumi et al. |
| 9,649,851 | B2 | 5/2017 | Fukasawa |
| 9,975,340 | B2 | 5/2018 | Karita |
| 10,406,838 | B2 | 9/2019 | Ohashi et al. |
| 10,850,529 | B2 | 12/2020 | Nakano et al. |
| 10,974,527 | B2 | 4/2021 | Ohashi et al. |
| 11,529,814 | B2 | 12/2022 | Nakano |
| 2009/0289976 | A1 | 11/2009 | Nishimura |
| 2010/0013883 | A1 | 1/2010 | Nishimura et al. |
| 2011/0032296 | A1 | 2/2011 | Nakano et al. |
| 2011/0249062 | A1 | 10/2011 | Nakano et al. |
| 2012/0062651 | A1 | 3/2012 | Takahashi et al. |
| 2014/0168295 | A1 | 6/2014 | Ichihara et al. |
| 2017/0197416 | A1 | 7/2017 | Moriya et al. |
| 2017/0197417 | A1* | 7/2017 | Karita ...................... B41J 2/155 |
| 2017/0266978 | A1 | 9/2017 | Curran |
| 2017/0297344 | A1 | 10/2017 | Ibe et al. |
| 2018/0236797 | A1 | 8/2018 | Ohashi et al. |
| 2019/0009565 | A1* | 1/2019 | Kosuge .................... B41J 29/38 |
| 2020/0016911 | A1 | 1/2020 | Ohashi et al. |
| 2020/0108597 | A1 | 4/2020 | Oikawa et al. |
| 2020/0108627 | A1 | 4/2020 | Nakano |
| 2020/0108628 | A1 | 4/2020 | Ezumi et al. |
| 2021/0039400 | A1 | 2/2021 | Nakano |
| 2023/0071122 | A1 | 3/2023 | Nakano |

FOREIGN PATENT DOCUMENTS

| | | | |
|---|---|---|---|
| EP | 3363639 | A1 | 8/2018 |
| JP | 2007-069419 | A | 3/2007 |
| JP | 2010-274448 | A | 12/2010 |
| JP | 2017-121784 | A | 7/2017 |
| JP | 2020-059152 | A | 4/2020 |
| JP | 2022-173414 | A | 11/2022 |

OTHER PUBLICATIONS

May 12, 2021 Chinese Office Action in Chinese Patent Application No. 201910931183.1.

Jun. 20, 2023 Japanese Official Action in Japanese Patent Appln. No. 2022-154487.

Aug. 6, 2024 Japanese Official Action in Japanese Patent Appln. No. 2023-152373.

Nov. 5, 2024 Japanese Official Action in Japanese Patent Appln. No. 2023-152373.

* cited by examiner

| T(ksum) [SECOND] | Tx [SECOND] |
|---|---|
| ≤ 600 SECONDS | 5 |
| 600 SECONDS < | 10 |
| 900 SECONDS < | 15 |

FIG.11

| FIG. 12A | FIG. 12B |
|---|---|

PRINTING APPARATUS AND METHOD OF CONTROLLING PRINTING APPARATUS

This application is a continuation of application Ser. No. 17/082,054, filed Oct. 28, 2020, which is a continuation of application Ser. No. 16/589,333 filed Oct. 1, 2019, U.S. Pat. No. 10,850,529 B2.

BACKGROUND OF THE INVENTION

Field of the Invention

The present invention relates to a printing apparatus that circulates inks through a print head and circulation paths including the print head, and a method of controlling the printing apparatus.

Description of the Related Art

Inkjet printing apparatuses have a problem of increase in viscosity of ink near the ejection openings of the print head due to evaporation of volatile components in the ink from the ejection openings. A method involving circulating ink to be supplied to the print head in a circulation path has been known as a measure against the above problem. Here, since the ink is circulated, fresh ink is always supplied to the ink ejection openings and therefore moisture evaporates from the ejection openings. This leads to a problem of gradual increase in concentration of the ink in the entire circulation path, which concentrates the ink.

U.S. Patent Laid-Open No. 2017/0197417 discloses a technique in which a circulation configuration that performs ink circulation for each ink color circulates only a black ink and does not circulate chromatic color inks during printing in a monochrome mode to avoid concentration of the chromatic color inks.

In a case where printing is performed successively in the monochrome mode in accordance with the technique of U.S. Patent Laid-Open No. 2017/0197417, the chromatic color inks remain uncirculated for a while. This may raise the viscosity of the inks near the ejection openings for ejecting the chromatic color inks. In this case, if the printing mode is switched from the monochrome mode to a color mode and printing is performed in the color mode, ejection failure of the chromatic color inks may possibly occur and the printing may possibly fail to be performed properly.

SUMMARY OF THE INVENTION

A printing apparatus according to the present invention is a printing apparatus comprising: a print head comprising, for each of a plurality of types of inks, an ejection opening from which to eject an ink and a pressure chamber in which to fill the ink to be ejected from the ejection opening, and configured to perform printing operation by ejecting the ink from the ejection opening; a circulation unit capable of circulating each of the plurality of types of inks in a circulation path including the pressure chamber; a control unit configured to, in a case where the printing operation is performed, cause the circulation unit to circulate a type of ink among the plurality of types of inks being used for printing in the printing operation in the circulation path corresponding to the type of ink being used for printing and cause the circulation unit to not circulate a type of ink among the plurality of types of inks not being used in the printing operation in the circulation path corresponding to the type of ink not being used in the printing operation, and stop the ink circulation after the printing operation is finished, and a determination unit configured to determine an accumulated time for which a first type of ink is circulated by the circulation unit in the printing operation using the first type of ink and not using a second type of ink different from the first type of ink. The control unit performs control on the basis of the accumulated time determined by the determination unit to cause the circulation unit to circulate at least the second type of ink among the plurality of types of inks in a case where the accumulated time is longer than a predetermined time and cause the circulation unit not to circulate the second type of ink in a case where the accumulated time is not longer than the predetermined time.

Further features of the present invention will become apparent from the following description of exemplary embodiments with reference to the attached drawings.

BRIEF DESCRIPTION OF THE DRAWINGS

FIG. 11 is a table showing the associations between circulation times and wait times;

DESCRIPTION OF THE EMBODIMENTS

Figure 1:
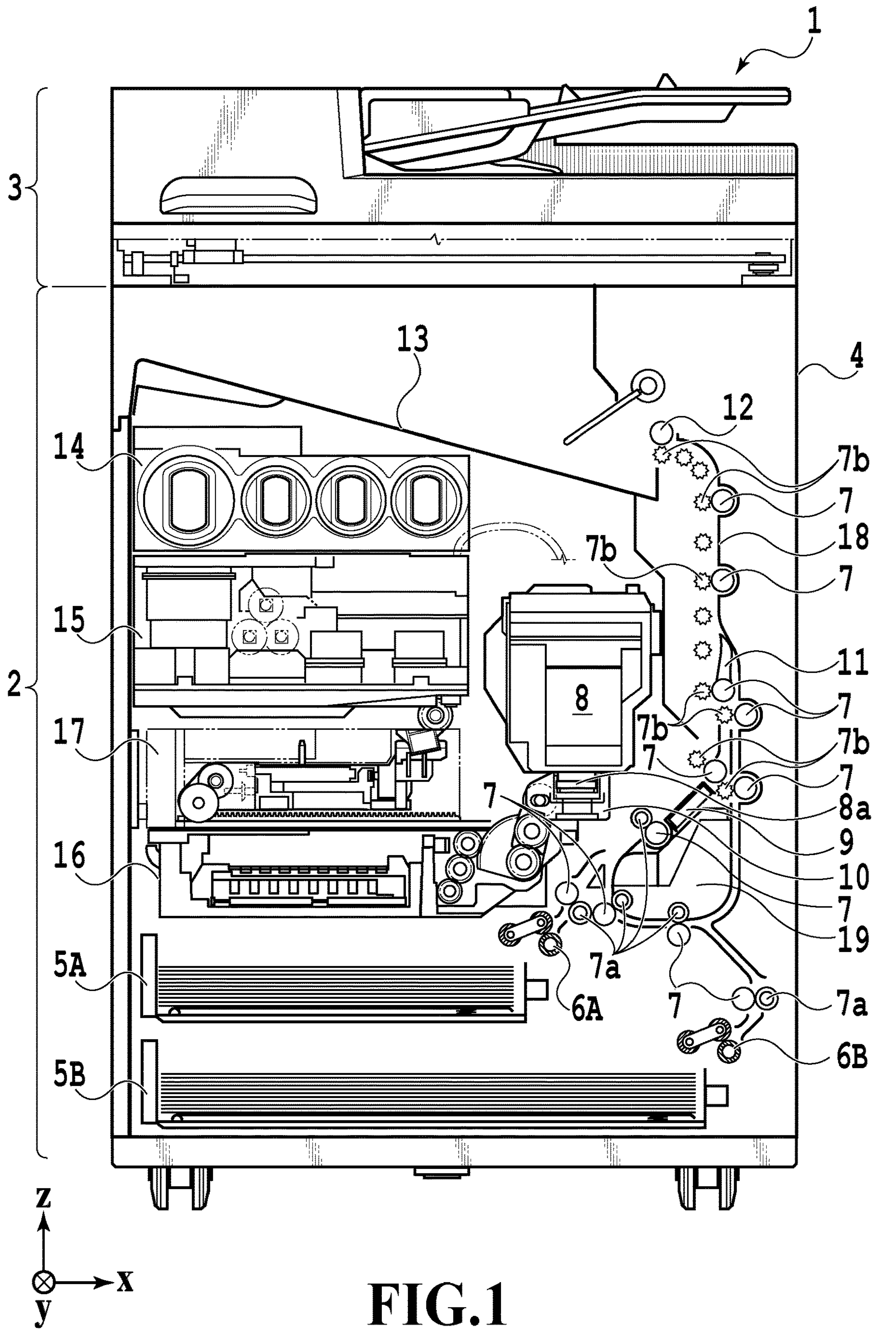
FIG. 1 is a diagram showing a printing apparatus in a standby state.

Embodiments of the present invention will be described with reference to the drawings. It should be noted that the following embodiments do not limit the present invention and that not all of the combinations of the characteristics described in the present embodiments are essential for solving the problem to be solved by the present invention. Incidentally, the same reference numeral refers to the same component in the following description. Furthermore, relative positions, shapes, and the like of the constituent elements described in the embodiments are exemplary only and are not intended to limit the scope of the invention.

FIG. 1 is an internal configuration diagram of an inkjet printing apparatus 1 (hereinafter "printing apparatus 1") used in the present embodiment. In the drawings, an x-direction is a horizontal direction, a y-direction (a direction perpendicular to paper) is a direction in which ejection openings are arrayed in a print head 8 described later, and a z-direction is a vertical direction.

The printing apparatus 1 is a multifunction printer comprising a print unit 2 and a scanner unit 3. The printing apparatus 1 can use the print unit 2 and the scanner unit 3 separately or in synchronization to perform various processes related to print operation and scan operation. The scanner unit 3 comprises an automatic document feeder (ADF) and a flatbed scanner (FBS) and is capable of scanning a document automatically fed by the ADF as well as scanning a document placed by a user on a document plate of the FBS. The present embodiment is directed to the multifunction printer comprising both the print unit 2 and the scanner unit 3, but the scanner unit 3 may be omitted. FIG. 1 shows the printing apparatus 1 in a standby state in which neither print operation nor scan operation is performed.

In the print unit 2, a first cassette 5A and a second cassette 5B for housing a print medium (cut sheet) S are detachably provided at the bottom of a casing 4 in the vertical direction. A relatively small print medium of up to A4 size is placed flat and housed in the first cassette 5A and a relatively large print medium of up to A3 size is placed flat and housed in the second cassette 5B. A first feeding unit 6A for sequentially feeding a housed print medium is provided near the first cassette 5A. Similarly, a second feeding unit 6B is provided near the second cassette 5B. In print operation, a print medium S is selectively fed from either one of the cassettes.

Conveying rollers 7, a discharging roller 12, pinch rollers 7*a*, spurs 7*b*, a guide 18, an inner guide 19, and a flapper 11 are conveying mechanisms for guiding a print medium S in a predetermined direction. The conveying rollers 7 are drive rollers located upstream and downstream of the print head 8 and driven by a conveying motor (not shown). The pinch rollers 7*a* are follower rollers that are turned while nipping a print medium S together with the conveying rollers 7. The discharging roller 12 is a drive roller located downstream of the conveying rollers 7 and driven by the conveying motor (not shown). The spurs 7*b* nip and convey a print medium S together with the conveying rollers 7 and discharging roller 12 located downstream of the print head 8.

The guide 18 is provided in a conveying path of a print medium S to guide the print medium S in a predetermined direction. The inner guide 19 is a member extending in the y-direction. The inner guide 19 has a curved side surface and guides a print medium S along the side surface. The flapper 11 is a member for changing a direction in which a print medium S is conveyed in duplex print operation. A discharging tray 13 is a tray for placing and housing a print medium S that was subjected to print operation and discharged by the discharging roller 12.

The print head 8 of the present embodiment is a full line type color inkjet print head. In the print head 8, a plurality of ejection openings configured to eject ink based on print data are arrayed in the y-direction in FIG. 1 so as to correspond to the width of a print medium S. Specifically, the print head 8 is configured to be capable individually ejecting inks of a plurality of types of inks. In the present embodiment, the print head 8 is configured to be capable of ejecting inks of a plurality of colors. When the print head 8 is in a standby position, an ejection opening surface 8*a* of the print head 8 is oriented vertically downward and capped with a cap unit 10 as shown in FIG. 1. In print operation, the orientation of the print head 8 is changed by a print controller 202 described later such that the ejection opening surface 8*a* faces a platen 9. The platen 9 includes a flat plate extending in the y-direction and supports, from the back side, a print medium S subjected to print operation by the print head 8. The movement of the print head 8 from the standby position to a printing position will be described later in detail.

An ink tank unit 14 separately stores ink of four colors to be supplied to the print head 8. An ink supply unit 15 is provided in the midstream of a flow path connecting the ink tank unit 14 to the print head 8 to adjust the pressure and flow rate of ink in the print head 8 within a suitable range. The present embodiment adopts a circulation type ink supply system, where the ink supply unit 15 adjusts the pressure of ink supplied to the print head 8 and the flow rate of ink collected from the print head 8 within a suitable range.

A maintenance unit 16 comprises the cap unit 10 and a wiping unit 17 and activates them at predetermined timings to perform maintenance operation for the print head 8. The maintenance operation will be described later in detail.

Figure 2:
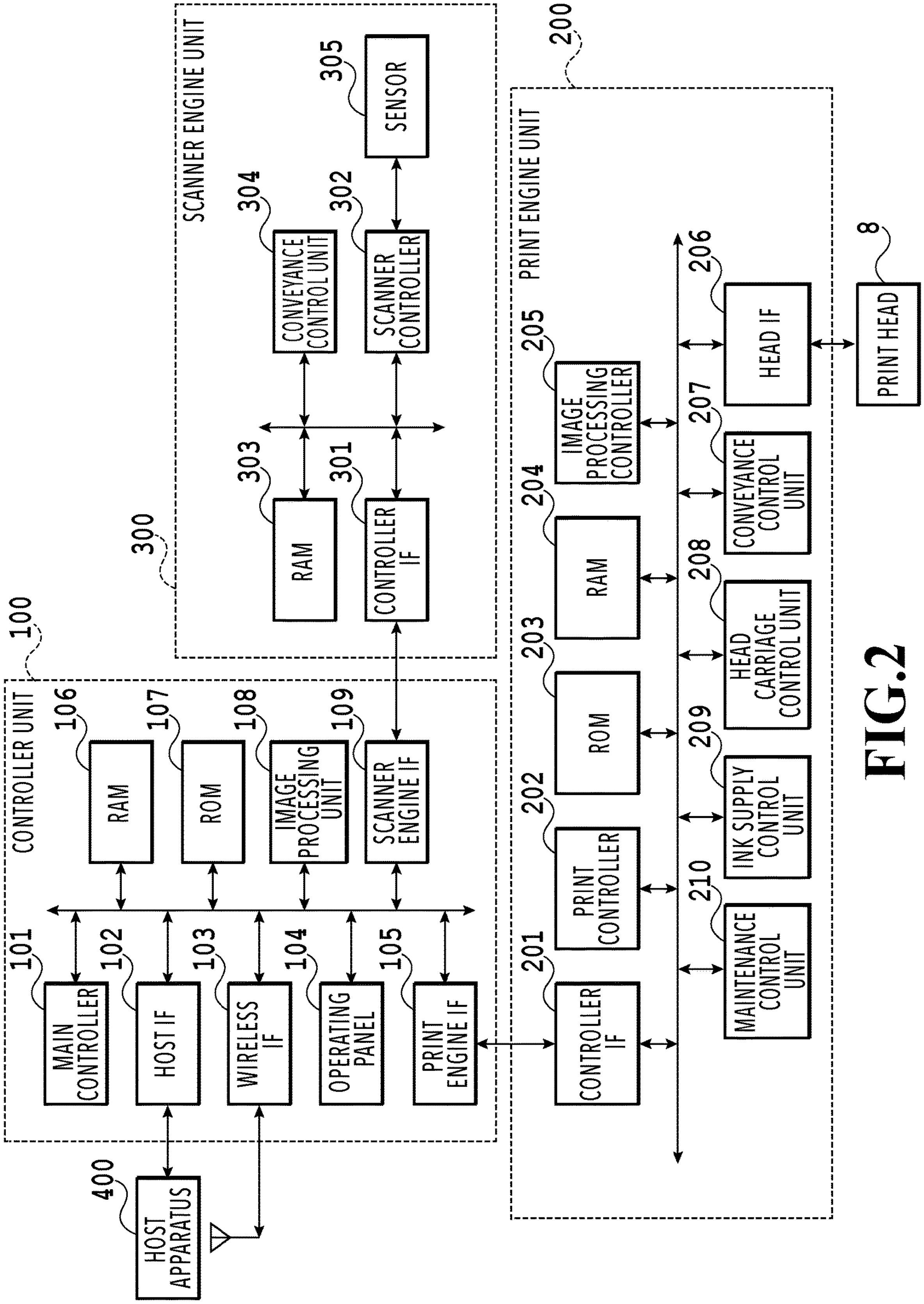
FIG. 2 is a control configuration diagram of the printing apparatus.

FIG. 2 is a block diagram showing a control configuration in the printing apparatus 1. The control configuration mainly includes a print engine unit 200 that exercises control over the print unit 2, a scanner engine unit 300 that exercises control over the scanner unit 3, and a controller unit 100 that exercises control over the entire printing apparatus 1. A print controller 202 controls various mechanisms of the print engine unit 200 under instructions from a main controller 101 of the controller unit 100. Various mechanisms of the scanner engine unit 300 are controlled by the main controller 101 of the controller unit 100. The control configuration will be described below in detail.

In the controller unit 100, the main controller 101 including a CPU controls the entire printing apparatus 1 using a RAM 106 as a work area in accordance with various parameters and programs stored in a ROM 107. For example, when a print job is input from a host apparatus 400 via a host I/F 102 or a wireless I/F 103, an image processing unit 108 executes predetermined image processing for received image data under instructions from the main controller 101. The main controller 101 transmits the image data subjected to the image processing to the print engine unit 200 via a print engine I/F 105.

The printing apparatus 1 may acquire image data from the host apparatus 400 via a wireless or wired communication or acquire image data from an external storage unit (such as a USB memory) connected to the printing apparatus 1. A communication system used for the wireless or wired communication is not limited. For example, as a communication system for the wireless communication, Wi-Fi (Wireless Fidelity; registered trademark) and Bluetooth (registered trademark) can be used. As a communication system for the wired communication, a USB (Universal Serial Bus) and the like can be used. For example, when a scan command is input from the host apparatus 400, the main controller 101 transmits the command to the scanner unit 3 via a scanner engine I/F 109.

An operating panel 104 is a mechanism to allow a user to do input and output for the printing apparatus 1. A user can give an instruction to perform operation such as copying and scanning, set a print mode, and recognize information about the printing apparatus 1 via the operating panel 104.

In the print engine unit 200, the print controller 202 including a CPU controls various mechanisms of the print unit 2 using a RAM 204 as a work area in accordance with various parameters and programs stored in a ROM 203. When various commands and image data are received via a controller I/F 201, the print controller 202 temporarily stores them in the RAM 204. The print controller 202 allows an image processing controller 205 to convert the stored image data into print data such that the print head 8 can use it for print operation. After the generation of the print data, the print controller 202 allows the print head 8 to perform print operation based on the print data via a head I/F 206. At this time, the print controller 202 conveys a print medium S by driving the feeding units 6A and 6B, conveying rollers 7, discharging roller 12, and flapper 11 shown in FIG. 1 via a conveyance control unit 207. The print head 8 performs print operation in synchronization with the conveyance operation of the print medium S under instructions from the print controller 202, thereby performing printing.

A head carriage control unit 208 changes the orientation and position of the print head 8 in accordance with an operating state of the printing apparatus 1 such as a maintenance state or a printing state. An ink supply control unit 209 controls the ink supply unit 15 such that the pressure of ink supplied to the print head 8 is within a suitable range. A maintenance control unit 210 controls the operation of the cap unit 10 and wiping unit 17 in the maintenance unit 16 when performing maintenance operation for the print head 8.

In the scanner engine unit 300, the main controller 101 controls hardware resources of the scanner controller 302 using the RAM 106 as a work area in accordance with various parameters and programs stored in the ROM 107, thereby controlling various mechanisms of the scanner unit 3. For example, the main controller 101 controls hardware resources in the scanner controller 302 via a controller OF 301 to cause a conveyance control unit 304 to convey a document placed by a user on the ADF and cause a sensor 305 to scan the document. The scanner controller 302 stores scanned image data in a RAM 303. The print controller 202 can convert the image data acquired as described above into print data to enable the print head 8 to perform print operation based on the image data scanned by the scanner controller 302.

Figure 3:
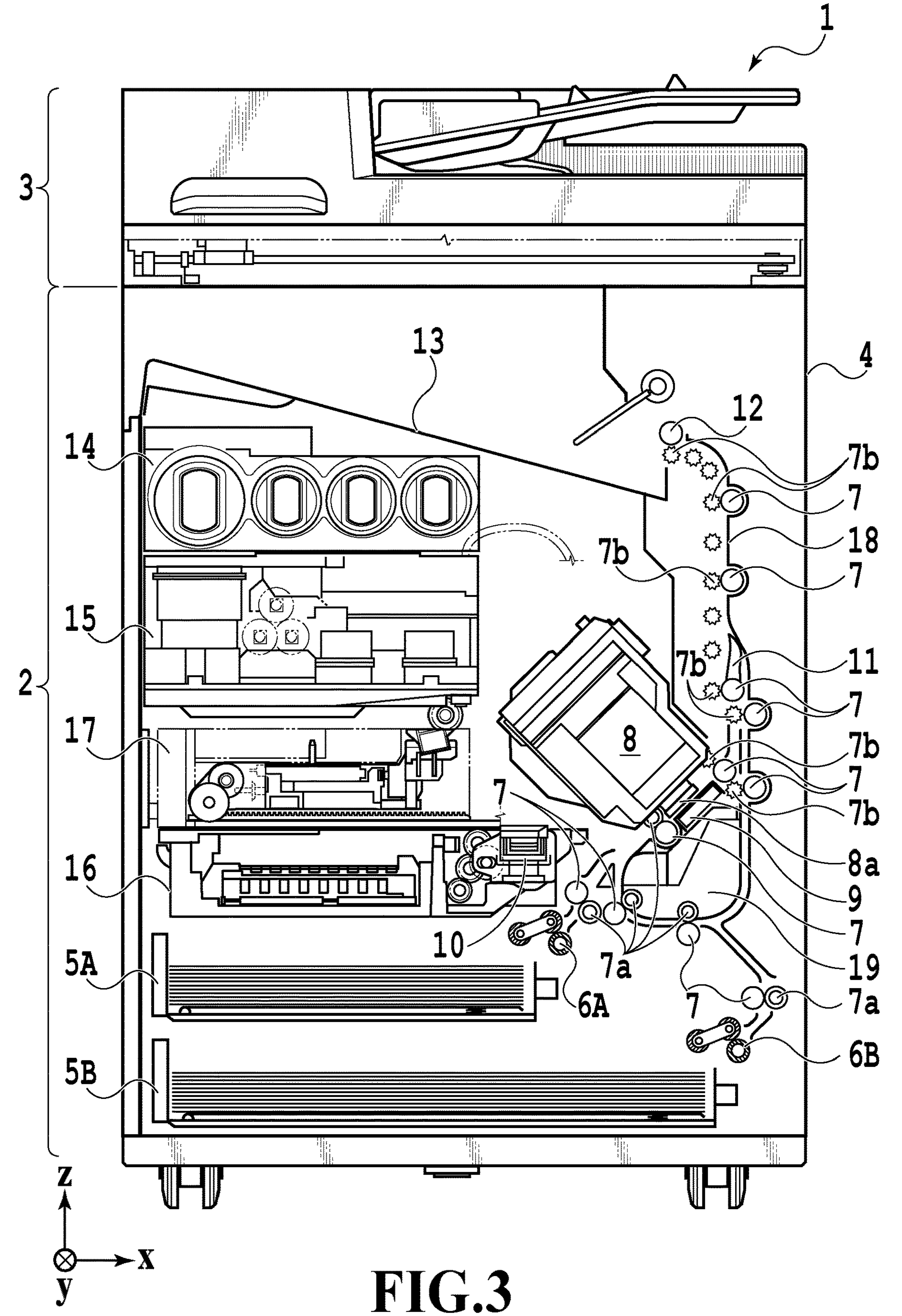
FIG. 3 is a diagram showing the printing apparatus in a printing state.

FIG. 3 shows the printing apparatus 1 in a printing state. As compared with the standby state shown in FIG. 1, the cap unit 10 is separated from the ejection opening surface 8*a* of the print head 8 and the ejection opening surface 8*a* faces the platen 9. In the present embodiment, the plane of the platen 9 is inclined about 45° with respect to the horizontal plane. The ejection opening surface 8*a* of the print head 8 in a printing position is also inclined about 45° with respect to the horizontal plane so as to keep a constant distance from the platen 9.

In the case of moving the print head 8 from the standby position shown in FIG. 1 to the printing position shown in FIG. 3, the print controller 202 uses the maintenance control unit 210 to move the cap unit 10 down to an evacuation position shown in FIG. 3, thereby separating the cap member 10*a* from the ejection opening surface 8*a* of the print head 8. The print controller 202 then uses the head carriage control unit 208 to turn the print head 8 45° while adjusting the vertical height of the print head 8 such that the ejection opening surface 8*a* faces the platen 9. After the completion of print operation, the print controller 202 reverses the above procedure to move the print head 8 from the printing position to the standby position.

Next, a conveying path of a print medium S in the print unit 2 will be described. When a print command is input, the print controller 202 first uses the maintenance control unit 210 and the head carriage control unit 208 to move the print head 8 to the printing position shown in FIG. 3. The print controller 202 then uses the conveyance control unit 207 to drive either the first feeding unit 6A or the second feeding unit 6B in accordance with the print command and feed a print medium S.

Figure 4:
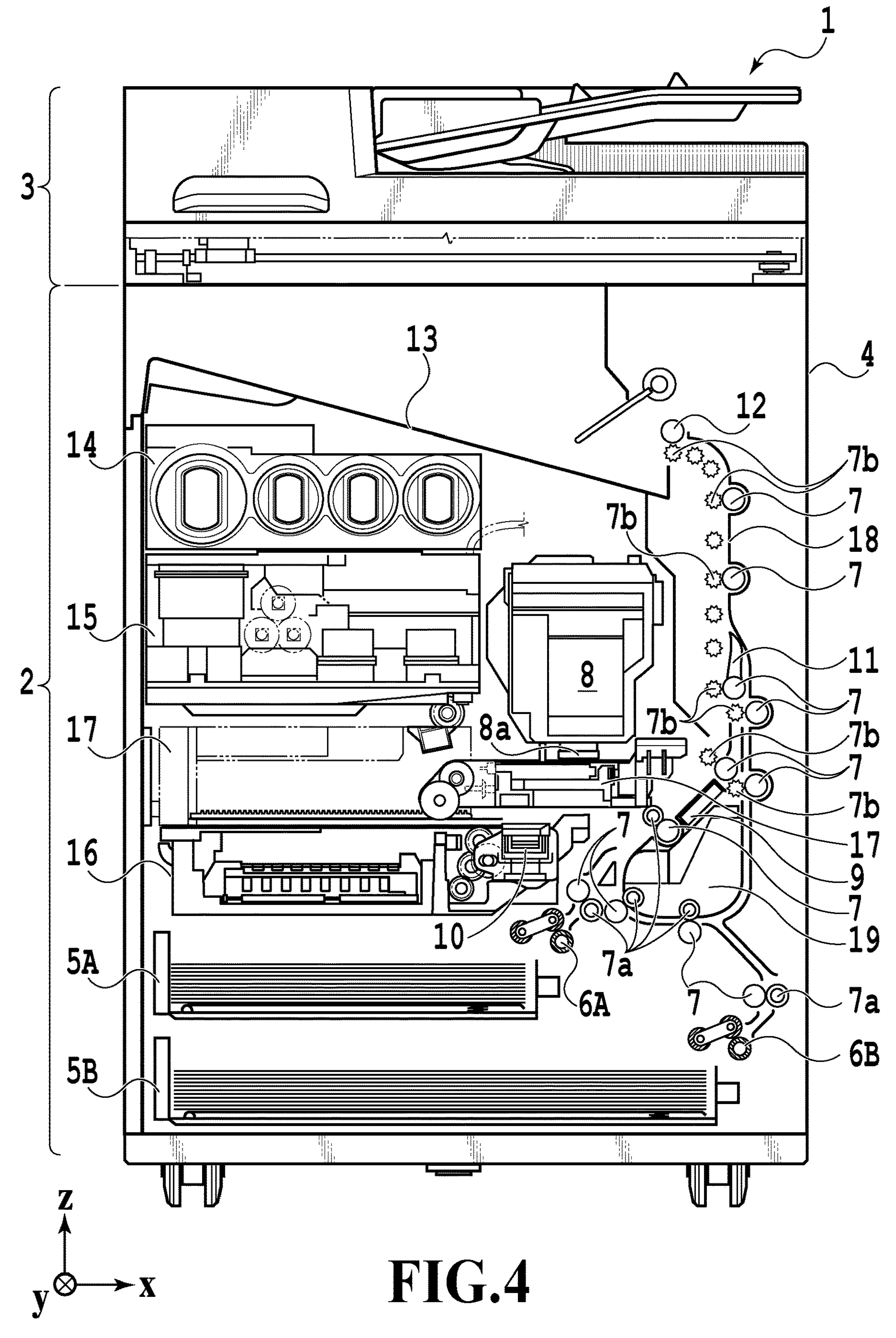
FIG. 4 is a diagram showing the printing apparatus in a maintenance state.

FIG. 4 is a diagram showing the printing apparatus 1 in a maintenance state. In the case of moving the print head 8 from the standby position shown in FIG. 1 to a maintenance position shown in FIG. 4, the print controller 202 moves the print head 8 vertically upward and moves the cap unit 10 vertically downward. The print controller 202 then moves the wiping unit 17 from the evacuation position to the right in FIG. 4. After that, the print controller 202 moves the print head 8 vertically downward to the maintenance position where maintenance operation can be performed.

On the other hand, in the case of moving the print head 8 from the printing position shown in FIG. 3 to the maintenance position shown in FIG. 4, the print controller 202 moves the print head 8 vertically upward while turning it 45°. The print controller 202 then moves the wiping unit 17 from the evacuation position to the right. Following that, the print controller 202 moves the print head 8 vertically downward to the maintenance position where maintenance operation can be performed by the maintenance unit 16.

Figure 5A:
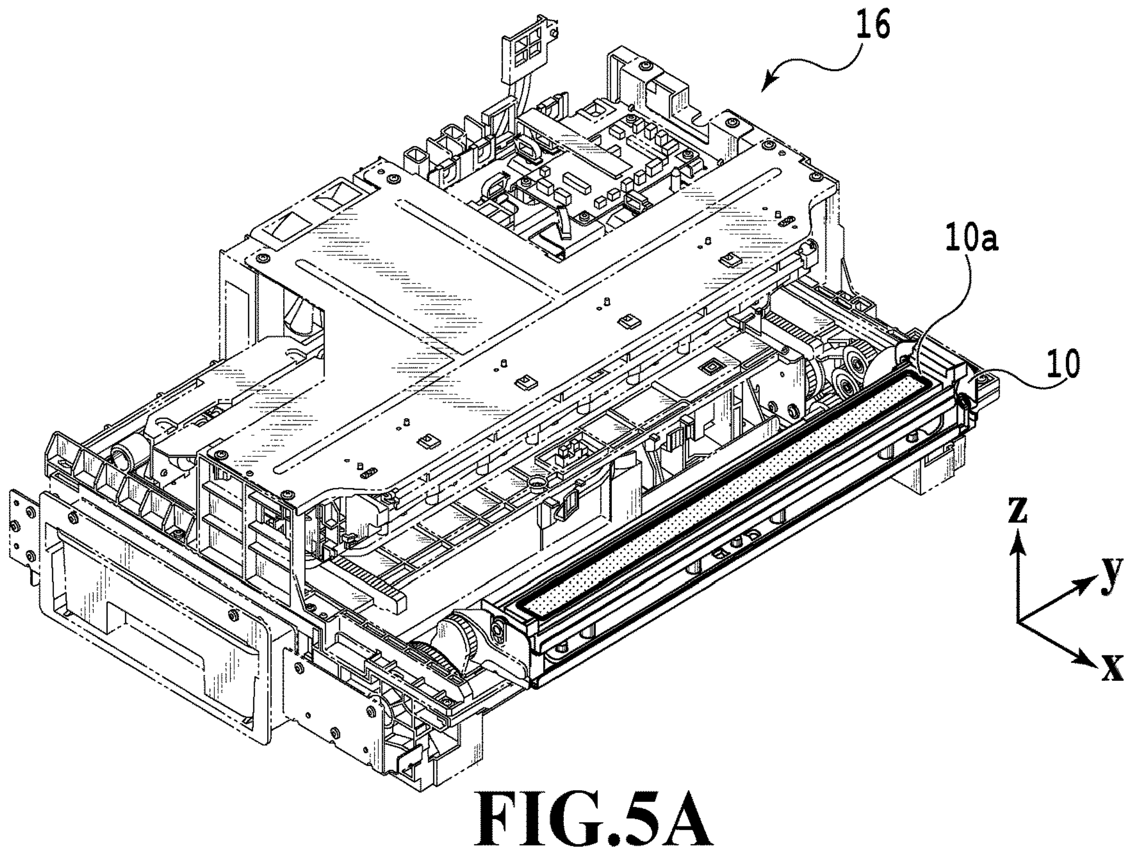
FIGS. 5A and 5B are perspective views showing the configuration of a maintenance unit.
Figure 5B:
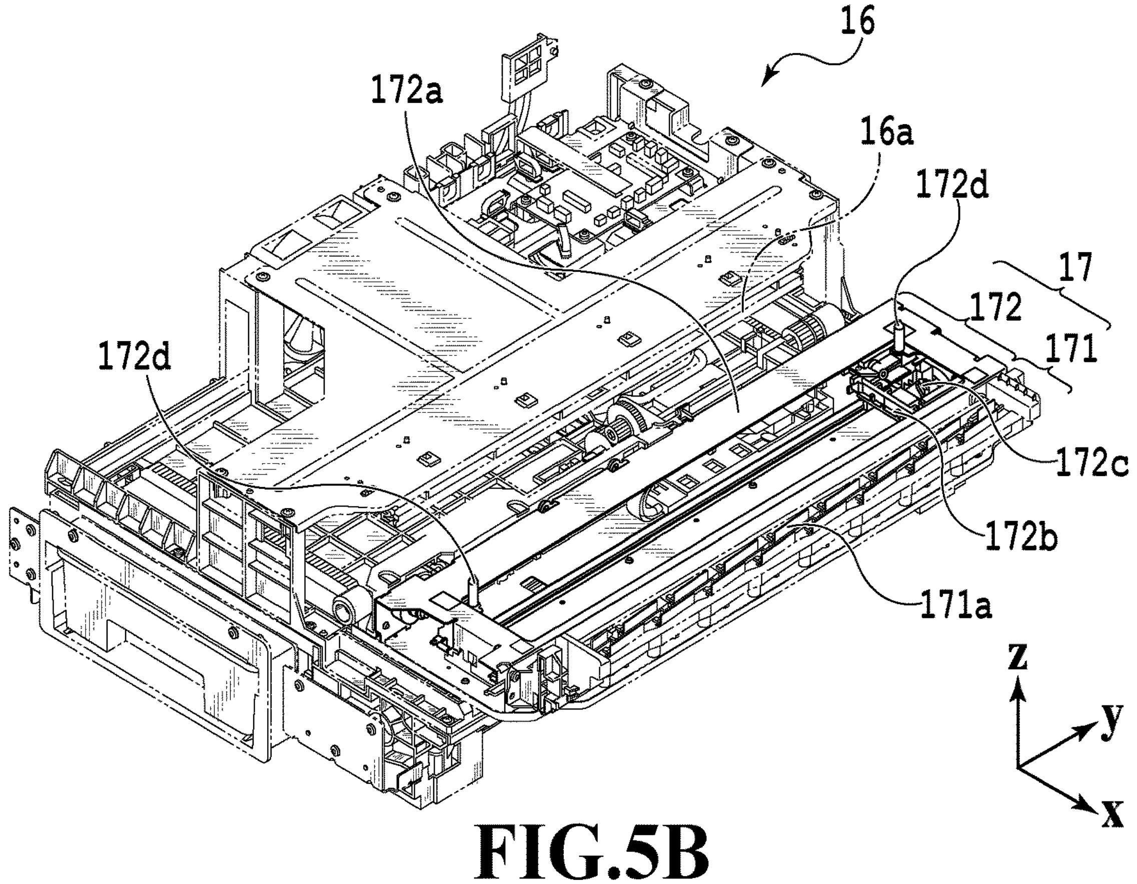

FIG. 5A is a perspective view showing the maintenance unit 16 in a standby position. FIG. 5B is a perspective view showing the maintenance unit 16 in a maintenance position. FIG. 5A corresponds to FIG. 1 and FIG. 5B corresponds to FIG. 4. When the print head 8 is in the standby position, the maintenance unit 16 is in the standby position shown in FIG. 5A, the cap unit 10 has been moved vertically upward, and the wiping unit 17 is housed in the maintenance unit 16. The cap unit 10 comprises a box-shaped cap member 10*a* extending in the y-direction. The cap member 10*a* can be brought into intimate contact with the ejection opening surface 8*a* of the print head 8 to prevent ink from evaporating from the ejection openings. The cap unit 10 also has the function of collecting ink ejected to the cap member 10*a* for preliminary ejection or the like and allowing a suction pump (not shown) to suck the collected ink.

On the other hand, in the maintenance position shown in FIG. 5B, the cap unit 10 has been moved vertically downward and the wiping unit 17 has been drawn from the maintenance unit 16. The wiping unit 17 comprises two wiper units: a blade wiper unit 171 and a vacuum wiper unit 172.

In the blade wiper unit 171, blade wipers 171*a* for wiping the ejection opening surface 8*a* in the x-direction are provided in the y-direction by the length of an area where the ejection openings are arrayed. In the case of performing wiping operation by the use of the blade wiper unit 171, the wiping unit 17 moves the blade wiper unit 171 in the x-direction while the print head 8 is positioned at a height at which the print head 8 can be in contact with the blade wipers 171*a*. This movement enables the blade wipers 171*a* to wipe ink and the like adhering to the ejection opening surface 8*a*.

The entrance of the maintenance unit 16 through which the blade wipers 171*a* are housed is equipped with a wet wiper cleaner 16*a* for removing ink adhering to the blade wipers 171*a* and applying a wetting liquid to the blade wipers 171*a*. The wet wiper cleaner 16*a* removes substances adhering to the blade wipers 171*a* and applies the wetting liquid to the blade wipers 171*a* each time the blade wipers 171*a* are inserted into the maintenance unit 16. The wetting liquid is transferred to the ejection opening surface 8*a* in the next wiping operation for the ejection opening surface 8*a*, thereby facilitating sliding between the ejection opening surface 8*a* and the blade wipers 171*a*.

The vacuum wiper unit 172 comprises a flat plate 172*a* having an opening extending in the y-direction, a carriage 172*b* movable in the y-direction within the opening, and a vacuum wiper 172*c* mounted on the carriage 172*b*. The vacuum wiper 172*c* is provided to wipe the ejection opening surface 8*a* in the y-direction along with the movement of the carriage 172*b*. The tip of the vacuum wiper 172*c* has a suction opening connected to the suction pump (not shown). Accordingly, if the carriage 172*b* is moved in the y-direction while operating the suction pump, ink and the like adhering to the ejection opening surface 8*a* of the print head 8 are wiped and gathered by the vacuum wiper 172*c* and sucked into the suction opening. At this time, the flat plate 172*a* and a dowel pin 172*d* provided at both ends of the opening are used to align the ejection opening surface 8*a* with the vacuum wiper 172*c*.

In the present embodiment, it is possible to carry out a first wiping process in which the blade wiper unit 171 performs wiping operation and the vacuum wiper unit 172 does not perform wiping operation and a second wiping process in which both the wiper units sequentially perform wiping operation. In the case of the first wiping process, the print controller 202 first draws the wiping unit 17 from the maintenance unit 16 while the print head 8 is evacuated vertically above the maintenance position shown in FIG. 4. The print controller 202 moves the print head 8 vertically downward to a position where the print head 8 can be in contact with the blade wipers 171*a* and then moves the wiping unit 17 into the maintenance unit 16. This movement enables the blade wipers 171*a* to wipe ink and the like adhering to the ejection opening surface 8*a*. That is, the blade wipers 171*a* wipe the ejection opening surface 8*a* when moving from a position drawn from the maintenance unit 16 into the maintenance unit 16.

After the blade wiper unit 171 is housed, the print controller 202 moves the cap unit 10 vertically upward and brings the cap member 10*a* into intimate contact with the ejection opening surface 8*a* of the print head 8. In this state, the print controller 202 drives the print head 8 to perform preliminary ejection and allows the suction pump to suck ink collected in the cap member 10*a*.

In the case of the second wiping process, the print controller 202 first slides the wiping unit 17 to draw it from the maintenance unit 16 while the print head 8 is evacuated vertically above the maintenance position shown in FIG. 4. The print controller 202 moves the print head 8 vertically downward to the position where the print head 8 can be in contact with the blade wipers 171*a* and then moves the wiping unit 17 into the maintenance unit 16. This movement enables the blade wipers 171*a* to perform wiping operation for the ejection opening surface 8*a*. Next, the print controller 202 slides the wiping unit 17 to draw it from the maintenance unit 16 to a predetermined position while the print head 8 is evacuated again vertically above the maintenance position shown in FIG. 4. Then, the print controller 202 uses the flat plate 172*a* and the dowel pins 172*d* to align the ejection opening surface 8*a* with the vacuum wiper unit 172 while moving the print head 8 down to a wiping position shown in FIG. 4. After that, the print controller 202 allows the vacuum wiper unit 172 to perform the wiping operation described above. After evacuating the print head 8 vertically upward and housing the wiping unit 17, the print controller 202 allows the cap unit 10 to perform preliminary ejection into the cap member and suction operation of collected ink in the same manner as the first wiping process.

[Ink Supply Unit]

Figure 6:
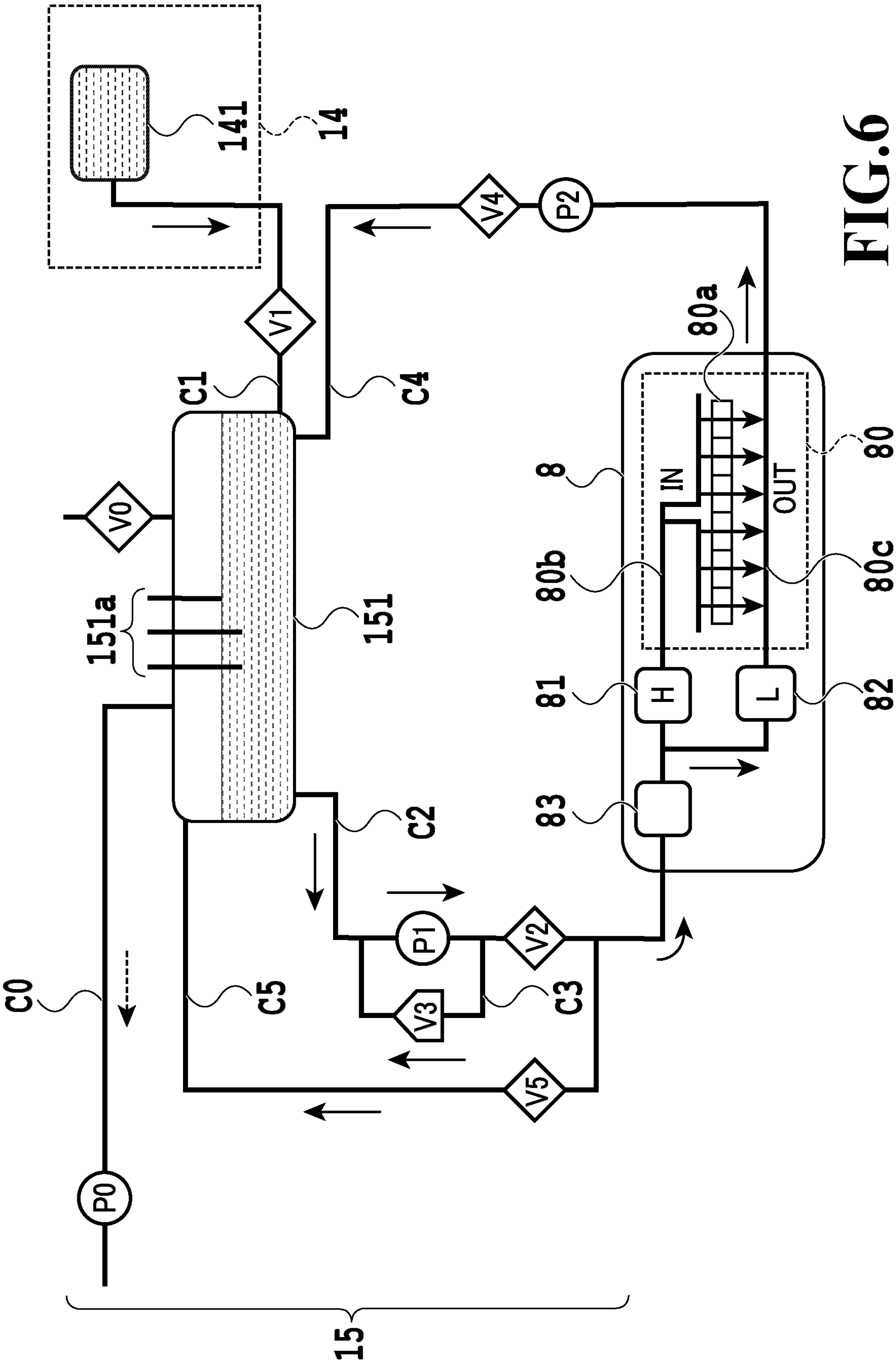
FIG. 6 is a diagram explaining the channel configuration of an ink circulation system.

FIG. 6 is a diagram including the ink supply unit 15 employed in the inkjet printing apparatus 1 of the present embodiment. The channel configuration of an ink circulation system of the present embodiment will be described with reference to FIG. 6. The ink supply unit 15 supplies an ink supplied from the ink tank unit 14 to the print head 8 (head unit). Such a configuration is actually prepared for each of the plurality of types of inks. In the present embodiment, such a configuration is prepared for each ink color. That is, although FIG. 6 shows a configuration for an ink of one color, such a configuration is actually prepared for each ink color. The ink supply unit 15 is basically controlled by the ink supply control unit 209, which is shown in FIG. 2. Components in the ink supply unit 15 will be described below.

Ink is circulated mainly between a sub tank 151 and the print head 8. At the print head 8, ink ejection operation is performed on the basis of image data, and the ink that is not ejected is collected into the sub tank 151 again.

The sub tank 151, which stores a predetermined amount of ink, is connected to a supply channel C2 for supplying ink to the print head 8 and a collection channel C4 for collecting ink from the print head 8. In other words, the sub tank 151, the supply channel C2, the print head 8, and the collection channel C4 form a circulation channel in which ink is circulated, and are parts of a circulation path in which ink is circulated. The sub tank 151 is also connected to a channel C0 in which air is caused to flow.

The sub tank 151 is provided with a liquid surface detection unit 151*a* including a plurality of electrode pins. By detecting the presence or absence of current conducted between these pins, the ink supply control unit 209 is capable of figuring out the level of the ink surface, i.e., the amount of ink remaining in the sub tank 151. A depressurizing pump P0 (tank internal pressure reduction pump) is a negative pressure generation source for depressurizing the inside of the sub tank 151. An air release valve V0 is a valve that brings the inside of the sub tank 151 into and out of communication with the atmosphere.

A main tank 141 is a tank storing ink to be supplied to the sub tank 151. The main tank 141 is configured to be detachable from the main body of the printing apparatus. At an intermediate portion of a tank connection channel C1 connecting the sub tank 151 and the main tank 141, a tank supply valve V1 is disposed which connects and disconnects the sub tank 151 and the main tank 141.

In a case where the ink supply control unit 209 detects that the ink in the sub tank 151 has been reduced to below a predetermined amount by means of the liquid surface detection unit 151*a*, the ink supply control unit 209 closes the air release valve V0, a supply valve V2, a collection valve V4, and a head replacement valve V5. The ink supply control unit 209 also opens the tank supply valve V1. In this state, the ink supply control unit 209 actuates the depressurizing pump P0. As a result, the pressure in the sub tank 151 becomes negative pressure, so that ink is supplied from the main tank 141 into the sub tank 151. In a case where the ink supply control unit 209 detects that the ink in the sub stank 151 has exceeded the predetermined amount by means of the liquid surface detection unit 151*a*, the ink supply control unit 209 closes the tank supply valve V1 and stops the depressurizing pump P0.

The supply channel C2 is a channel for supplying ink from the sub tank 151 to the print head 8, and a supply pump P1 and the supply valve V2 are disposed at intermediate portions of the supply channel C2. During printing operation, ink is supplied to the print head 8 and also ink is circulated in the circulation path by driving the supply pump P1 with the supply valve V2 open. The amount of ink ejected per unit time by the print head 8 varies depending on the image data. The flow rate of the supply pump P1 is determined so as to be able to handle a situation where the print head 8 performs ejection operation with the maximum amount of ink consumption per unit time.

A relief channel C3 is a channel located upstream of the supply valve V2 and connecting an upstream side and a downstream side of the supply pump P1. At an intermediate portion of the relief channel C3, a relief valve V3 is disposed which is a differential pressure valve. The relief valve is not opened and closed by a drive mechanism, but is urged by a spring and configured to open when a predetermined pressure is reached. For example, in a case where the amount of ink supply per unit time from the supply pump P1 is larger than the sum of the amount of ejection per unit time from the print head 8 and the flow rate (the amount of ink drawn) of a collection pump P2 per unit time, the relief valve V3 is opened according to the pressure exerted thereon. As a result, a cyclic channel formed of a part of the supply channel C2 and the relief channel C3 is formed. By providing the configuration of the relief channel C3, the amount of ink supply to the print head 8 is adjusted according to the amount of ink consumption at the print head 8. This stabilizes the pressure inside the circulation path irrespective of the image data.

The collection channel C4 is a channel for collecting ink from the print head 8 into the sub tank 151, and the collection pump P2 and the collection valve V4 are disposed at intermediate portions of the collection channel C4. The collection pump P2 serves as a negative pressure generation source to suck ink from the print head 8 in the case of circulating ink in the circulation path. By driving the collection pump P2, a suitable pressure difference is generated between an IN channel 80*b* and an OUT channel 80*c* in the print head 8, thereby enabling ink circulation from the IN channel 80*b* to the OUT channel 80*c*.

The collection valve V4 is also a valve to prevent backflow of ink while no printing operation is performed, that is, while ink is not circulated in the circulation path. In the circulation path of the present embodiment, the sub tank 151 is disposed above the print head 8 in the vertical direction (see FIG. 1). For this reason, while the supply pump P1 or the collection pump P2 is not driven, ink may possibly flow backwards from the sub tank 151 into the print head 8 due to the water head difference between the sub tank 151 and the print head 8. In the present embodiment, the collection valve V4 is provided to the collection channel C4 in order to prevent such backflow.

Note that the supply valve V2 also functions as a valve to prevent supply of ink from the sub tank 151 to the print head 8 while no printing operation is performed, that is, while ink is not circulated in the circulation path.

A head replacement channel C5 is a channel connecting the supply channel C2 and an air chamber in the sub tank 151 (the space where ink is not stored), and the head replacement valve V5 is disposed at an intermediate portion of the head replacement channel C5. One end of the head replacement channel C5 is connected to a portion of the supply channel C2 upstream of the print head 8 and downstream of the supply valve V2. The other end of the head replacement channel C5 is connected to an upper portion of the sub tank 151 and communicates with the air chamber in the sub tank 151. The head replacement channel C5 is used to draw off ink from the print head 8 in use in occasions such as replacement of the print head 8 and transport of the printing apparatus 1. The head replacement valve V5 is controlled to be closed by the ink supply control unit 209 in occasions other than filling ink into the print head 8 and collecting ink from the print head 8.

Next, the channel configuration inside the print head 8 will be described. Ink supplied from the supply channel C2 to the print head 8 is supplied to a first negative pressure control unit 81 and a second negative pressure control unit 82 through a filter 83. The controlled pressure at the first negative pressure control unit 81 is set at a low negative pressure (a negative pressure having a small pressure difference from the atmospheric pressure). The controlled pressure at the second negative pressure control unit 82 is set at a high negative pressure (a negative pressure having a large pressure difference from the atmospheric pressure). The pressures at these first negative pressure control unit 81 and second negative pressure control unit 82 are generated within an appropriate range by driving the collection pump P2.

In an ink ejection unit 80, there are disposed a plurality of printing element boards 80*a* on each of which a plurality of ejection openings are arrayed, so that a long array of ejection openings is formed. A common supply channel 80*b* (IN channel) for guiding ink supplied from the first negative pressure control unit 81 and a common collection channel 80*c* (OUT channel) for guiding ink supplied from the second negative pressure control unit 82 also extend in the array direction of the printing element boards 80*a*. Further, in each printing element board 80*a*, there are formed individual supply channels to be connected to the common supply channel 80*b* and individual collection channels to be connected to the common collection channel 80*c*. For this reason, in each printing element board 80*a*, an ink flow is generated such that ink flows in from the common supply channel 80*b*, in which the negative pressure is lower, and flows out into the common collection channel 80*c*, in which the negative pressure is higher. In the paths between the individual supply channels and the individual collection channels, there are provided pressure chambers which communicate with the ejection openings and in which ink is filled. Ink flows also in ejection openings and pressure chambers that are not performing printing. As the printing element board 80*a* performs ejection operation, part of ink moving from the common supply channel 80*b* toward the common collection channel 80*c* is ejected from ejection openings and therefore consumed, whereas the part of the ink not ejected moves to the collection channel C4 through the common collection channel 80*c*.

Figure 7A:
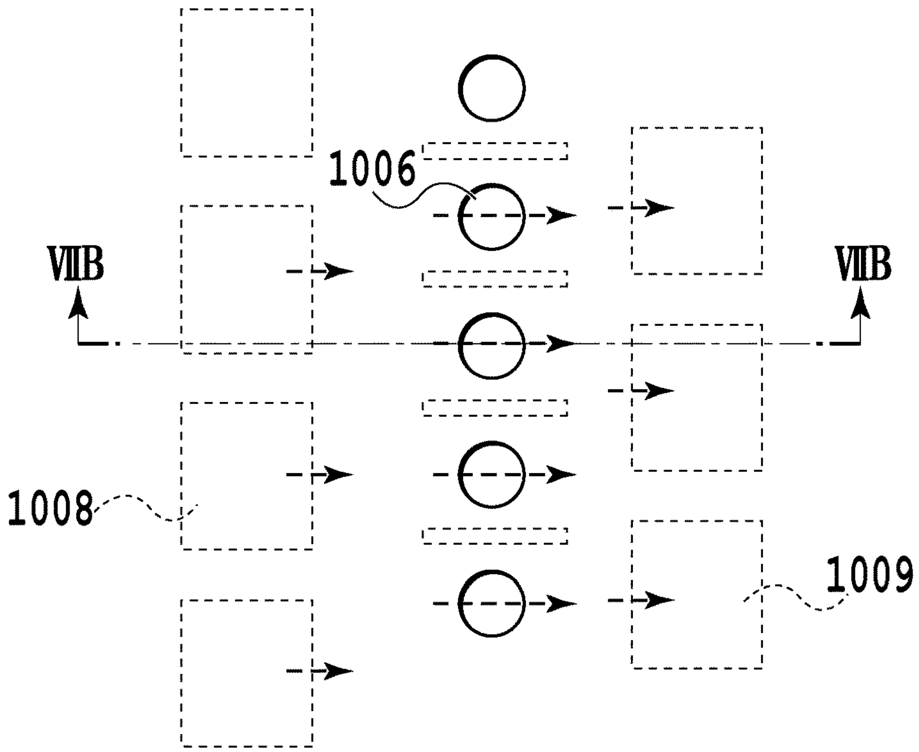
FIGS. 7A and 7B are diagrams explaining ejection openings and pressure chambers.
Figure 7B:
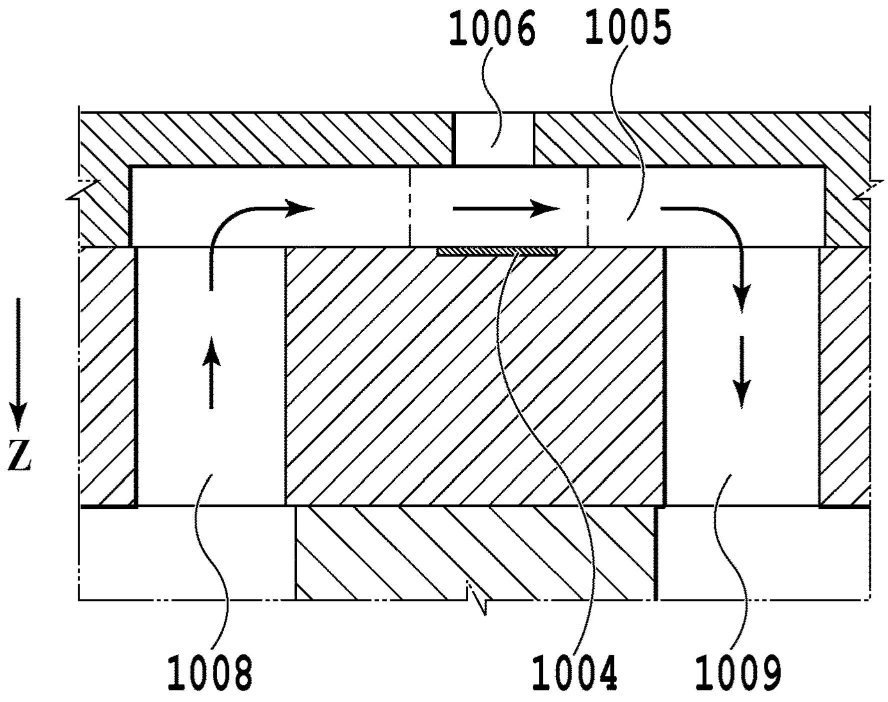

FIG. 7A is a partially enlarged schematic plan view of a printing element board 80*a*, and FIG. 7B is a schematic cross-sectional view along cross-sectional line VIIb-VIIb in FIG. 7A. In each printing element board 80*a*, pressure chambers 1005 in which to fill ink and ejection openings 1006 from which to eject ink are provided. In each pressure chamber 1005, a printing element 1004 is provided at a position facing the corresponding ejection opening 1006. Also, in each printing element board 80*a*, a plurality of individual supply channels 1008 to be connected to the common supply channel 80*b* and a plurality of individual collection channels 1009 to be connected to the common collection channel 80*c* are formed for each ejection opening 1006.

With the above configuration, in each printing element board 80*a*, an ink flow is generated such that ink flows in from the common supply channel 80*b*, in which the negative pressure is lower (the absolute value of the pressure is higher), and flows out into the common collection channel

80*c*, in which the negative pressure is higher (the absolute value of the pressure is lower). More specifically, ink flows through the common supply channel 80*b*, the individual supply channels 1008, the pressure chambers 1005, the individual collection channels 1009, and the common collection channel 80*c* in this order. When ink is ejected by some printing elements 1004, part of the ink moving from the common supply channel 80*b* toward the common collection channel 80*c* is ejected from the corresponding ejection openings 1006 and therefore discharged to the outside of the print head 8. On the other hand, the part of the ink not ejected from any of the ejection openings 1006 is collected into the collection channel C4 through the common collection channel 80*c*.

To perform printing operation with the above configuration, the ink supply control unit 209 closes the tank supply valve V1 and the head replacement valve V5, opens the air release valve V0, the supply valve V2, and the collection valve V4, and drives the supply pump P1 and the collection pump P2. As a result, a circulation path is established in which ink circulates through the sub tank 151, the supply channel C2, the print head 8, the collection channel C4, and the sub tank 151 in this order. Ink flows into the relief channel C3 from the supply channel C2 in a case where the amount of ink supply per unit time from the supply pump P1 is larger than the sum of the amount of ejection per unit time from the print head 8 and the flow rate per unit time at the collection pump P2. As a result, the flow rate of ink flowing into the print head 8 from the supply channel C2 is adjusted.

While no printing operation is performed, the ink supply control unit 209 stops the supply pump P1 and the collection pump P2 and closes the air release valve V0, the supply valve V2, and the collection valve V4. As a result, the ink flow inside the print head 8 stops and backflow due to the water head difference between the sub tank 151 and the print head 8 is prevented as well. Also, closing the air release valve V0 prevents leakage and evaporation of ink from the sub tank 151.

To collect ink from the print head 8, the ink supply control unit 209 closes the air release valve V0, the tank supply valve V1, the supply valve V2, and the collection valve V4, opens the head replacement valve V5, and drives the depressurizing pump P0. As a result, the pressure in the sub tank 151 becomes negative pressure, so that the ink in the print head 8 is collected into the sub tank 151 through the head replacement channel C5. As described above, the head replacement valve V5 is a valve closed during normal printing operation and standby and opened in a case of collecting ink from the print head 8. Note that the head replacement valve V5 is opened also in a case of filling ink into the head replacement channel C5 to fill ink into the print head 8.

The present embodiment has a circulation mode in which only a black ink is circulated and a circulation mode in which inks of all colors are circulated. In the circulation mode in which only the black ink is circulated, control is performed such that the chromatic color inks (cyan, magenta, and yellow) are not circulated and only the black ink is circulated in the above-described circulation path. On the other hand, in the circulation mode in which all-color circulation is performed, control is performed such that the inks of all colors (cyan, magenta, yellow, and black) are circulated in the above-described circulation path.

[Description of Ink Concentration by Ink Circulation]

Figure 8A:
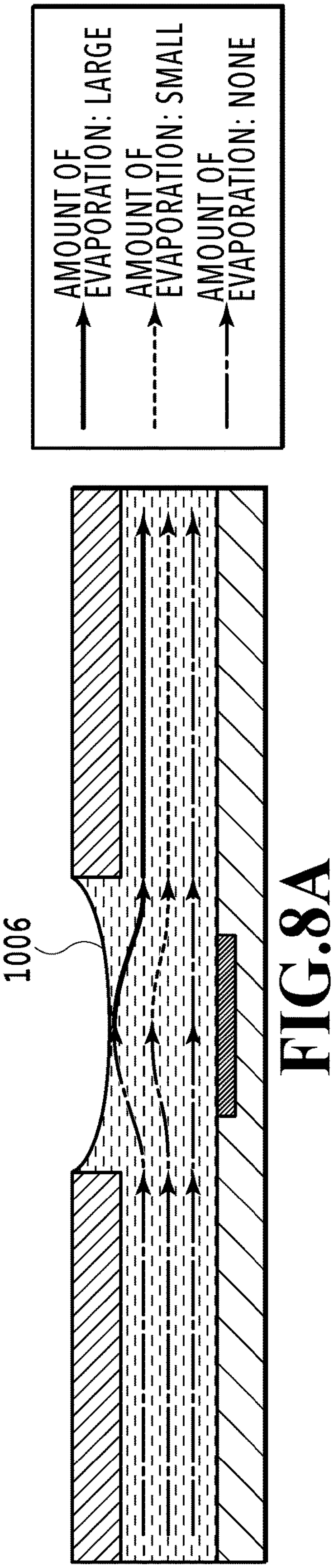
FIGS. 8A to 8C are diagrams explaining concentration of ink.
Figure 8B:
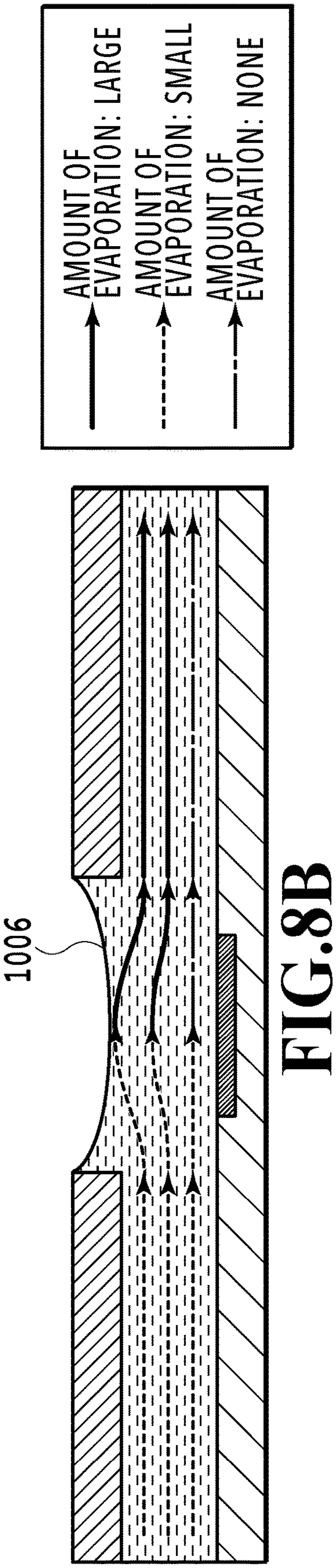
Figure 8C:
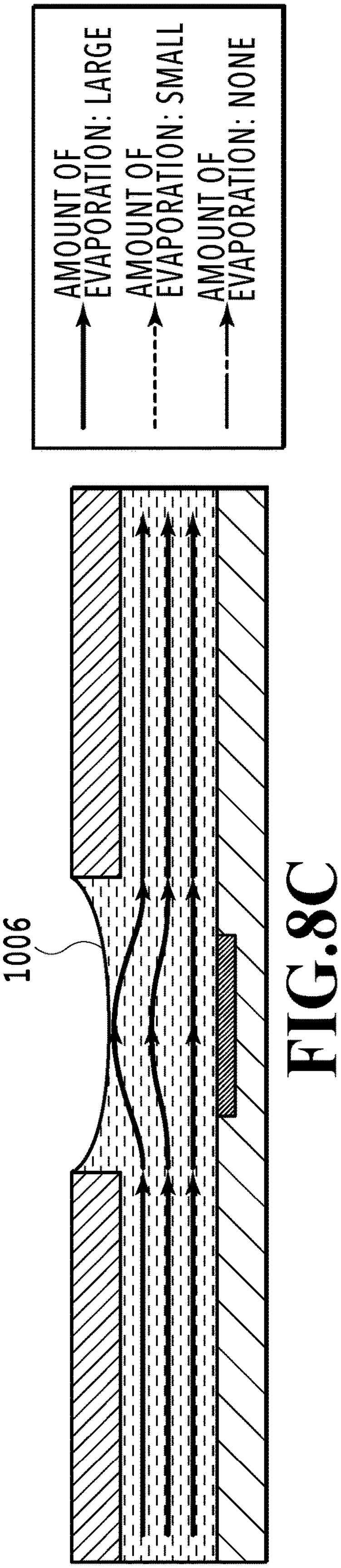

FIGS. 8A to 8C are enlarged schematic cross-sectional views of a portion around the ejection opening 1006 of the printing element board 80*a* in FIG. 7B. The ink concentration phenomenon that occurs due to ink circulation will be described with reference to FIGS. 8A to 8C. All of the three diagrams of FIGS. 8A, 8B, and 8C are diagrams showing the same ejection opening 1006 and are arranged such that the time elapses from FIG. 8A toward FIG. 8C. FIG. 8A is a diagram of ink before moisture evaporation flowing from the upstream side of the ejection opening 1006, passing by the ejection opening 1006, and flowing to the downstream side of the ejection opening 1006. As the ink passes the ejection opening 1006, the ink surface in the form of a meniscus in the ejection opening 1006 is exposed to the atmosphere. FIG. 8A shows that the closer the ink is to the ink surface exposed to the atmosphere, the greater the moisture evaporation is. A part of the ink after moisture evaporation is circulated again and mixed with a part of the ink before moisture evaporation in the circulation path.

FIG. 8B shows that the part of the ink upstream of the ejection opening 1006 is flowing in a state where a small amount of moisture has evaporated due to the mixing of the part of the ink after moisture evaporation in FIG. 8A and a part of the ink before moisture evaporation. As this part of the ink with a small amount of moisture evaporated passes the ejection opening 1006, its ink surface is exposed to the atmosphere again, so that moisture evaporates from portions of the ink close to the ink surface exposed to the atmosphere.

FIG. 8C shows a state where the moisture in the ink has evaporated to a greater extent as a result of repeating moisture evaporation at the ejection opening 1006, and therefore the concentration of the ink in the entire circulation path has risen and the ink has been concentrated. Considering the above, it is desirable not to circulate the inks of colors that are not used in printing, in order to prevent the concentration of these inks in their respective circulation paths. For example, in the present embodiment, in a case where the printing setting is a monochrome mode, the ink of black K is used and the chromatic color inks (cyan C, magenta M, and yellow Y) are not used. Then, in the circulation mode in which the black ink for printing in the monochrome mode is circulated, the chromatic color inks, which are the types of inks other than the black ink type, are not circulated in order to prevent concentration of the chromatic color inks in their respective circulation paths.

Here, without ink circulation, the ink near the ejection opening 1006 evaporates with time and therefore becomes thickened. The thickened ink may cause ejection failure. The thickened ink near the ejection opening 1006 can be removed by ink circulation. For this reason, it is desirable to circulate the chromatic color inks before performing printing using the chromatic color inks in a case where, for example, printing has been performed in the monochrome mode and the chromatic color inks have not therefore been circulated.

[Flowchart]

In the present embodiment, the chromatic color inks are circulated before printing operation using the chromatic color inks is performed in a case where this printing is performed after the circulation mode in which the chromatic color inks are not circulated is used for a predetermined time.

Figure 9:
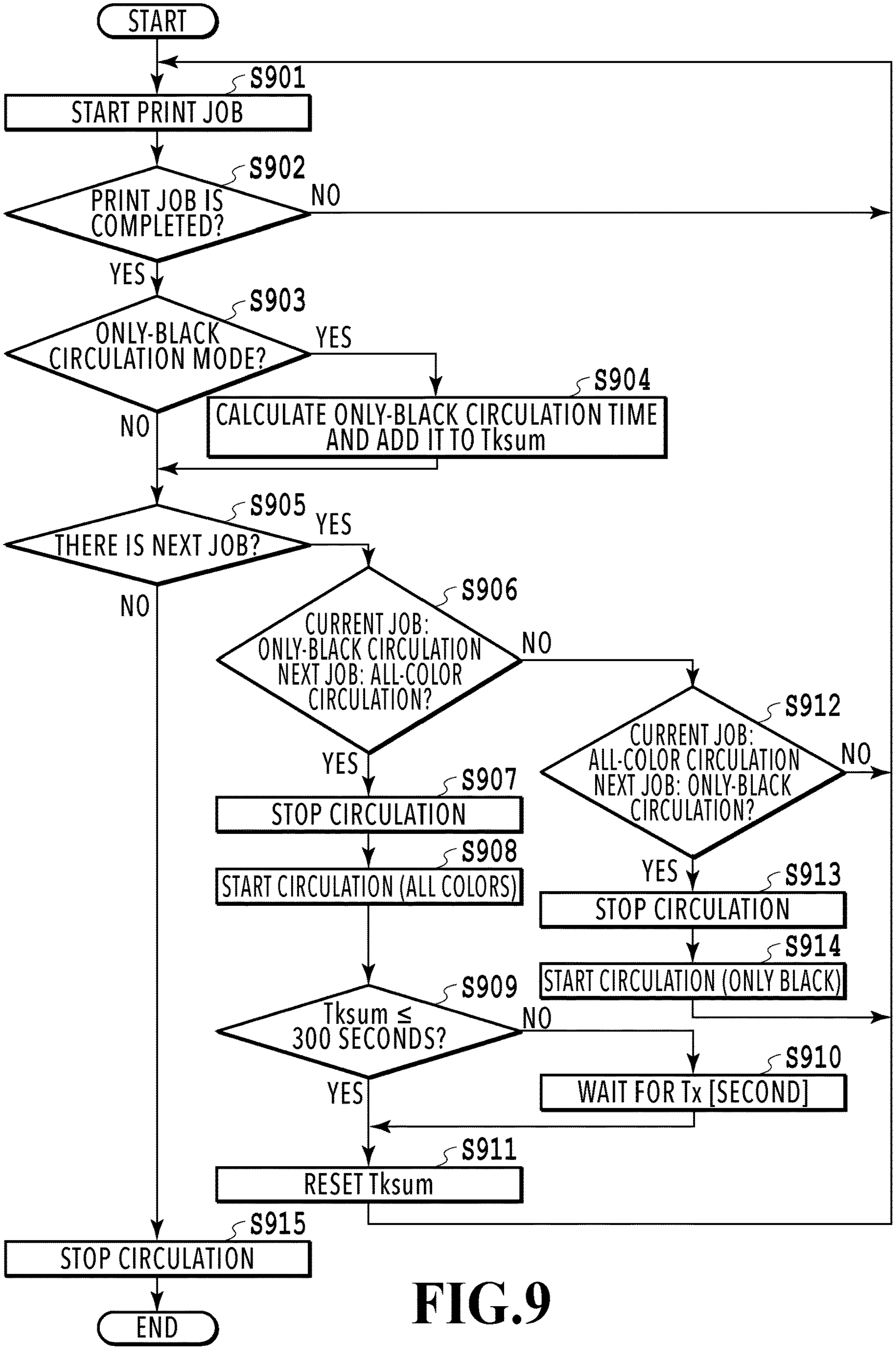
FIG. 9 is a flowchart showing processing involving performing all-color circulation according to a circulation time.

Details of this series of processes will be described with reference to a flowchart in FIG. 9. Meanwhile, the symbol "S" in the description of each process means a step in the flowchart.

In S901, the print controller 202 obtains a job and starts printing on the basis of the obtained job. The obtained job contains, for example, information for determining whether to perform printing in the monochrome mode, which uses the black ink, or to perform printing in a color mode, which uses the black ink and the chromatic color inks. Printing is performed in the circulation mode in which only the black ink is circulated if the obtained job indicates printing in the monochrome mode. Printing is performed in the circulation mode in which all-color circulation, i.e., circulation of the inks of all colors, is performed if the obtained job indicates printing in the color mode.

Figure 10A:
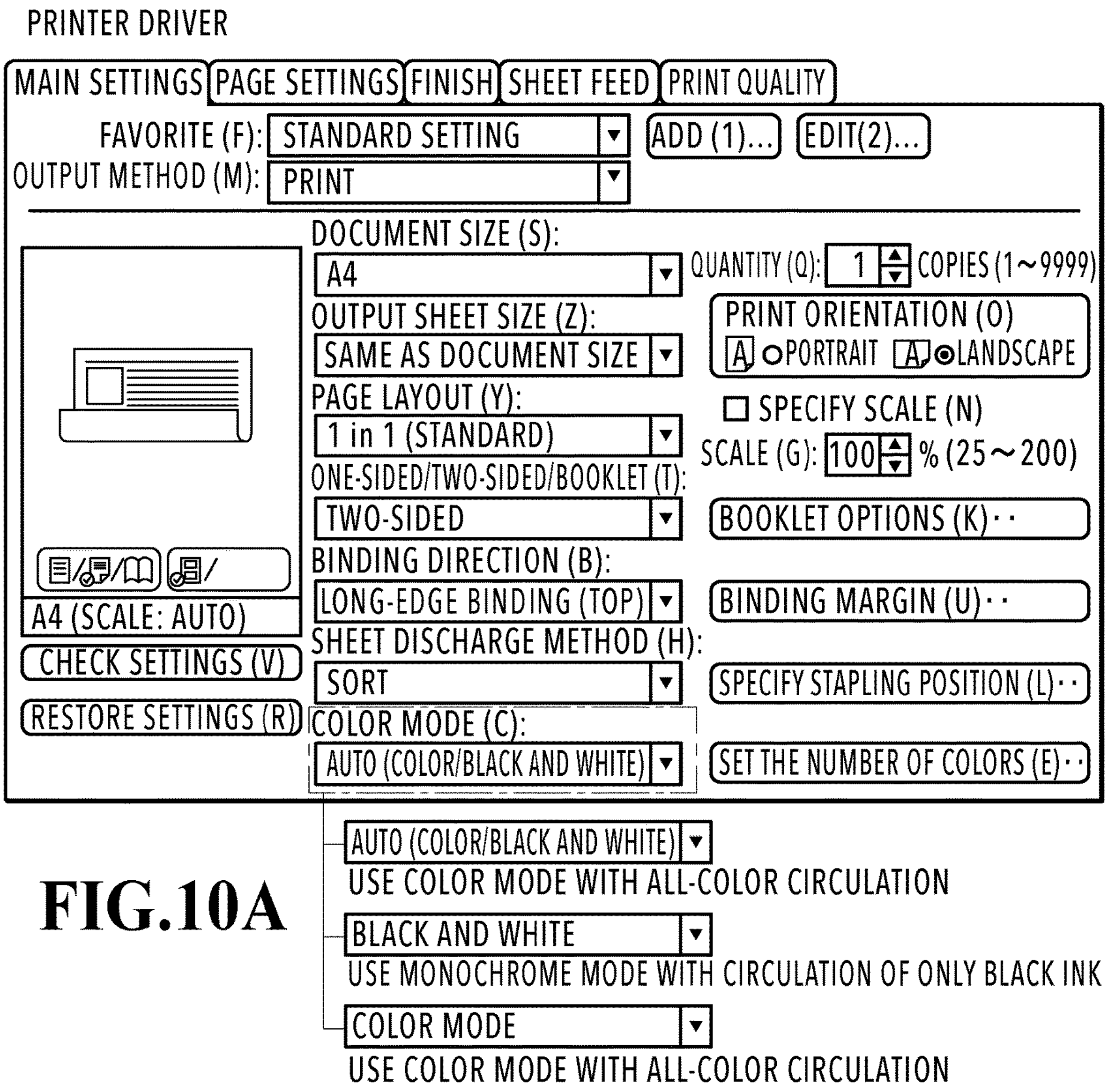
FIGS. 10A and 10B are diagrams showing UIs of a printer driver and the printing apparatus.

Here, the information on the setting whether to use the monochrome mode or the color mode is indicated through a driver in a PC by the user, for example. FIG. 10A is a screen of the driver displayed on the user's PC. As shown in FIG. 10A, in a case where "BLACK-AND-WHITE MODE" is selected through the driver, the print controller 202 selects a setting for performing printing in the monochrome mode on the basis of the information in the obtained job. With this setting selected, printing will be performed in the circulation mode in which only the black ink is circulated.

On the other hand, in a case where "AUTO (COLOR/BLACK AND WHITE)" or "COLOR MODE" is selected through the driver, the print controller 202 selects a setting for performing printing in the color mode on the basis of the information in the obtained job. With this setting selected, printing will be performed in the circulation mode in which all-color circulation is performed.

Figure 10B:
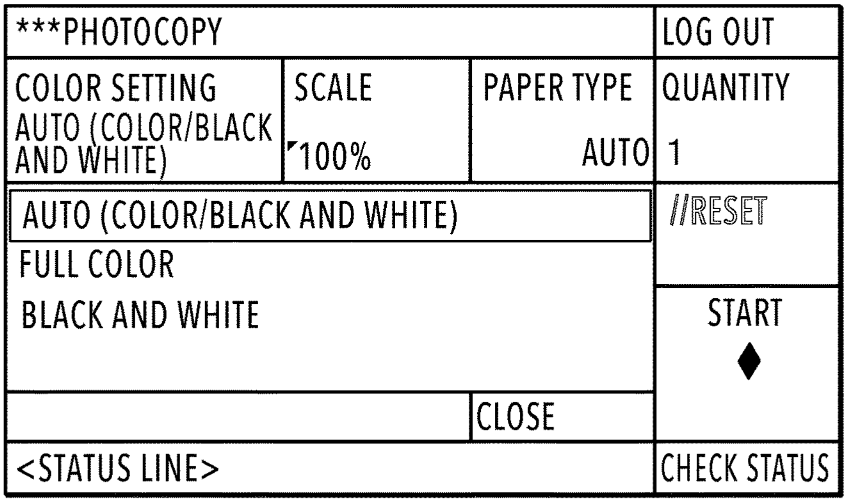

FIG. 10B is a diagram showing an UI on the operating panel 104 of the printing apparatus 1. In a case where the user selects black-and-white photocopying through the UI shown in FIG. 10B, the print controller 202 also selects the setting for performing printing in the monochrome mode on the basis of the information in the obtained job, as in the case where "BLACK-AND-WHITE MODE" is selected through the PC's driver. With this setting selected, printing will be performed in the circulation mode in which only the black ink is circulated. The print controller 202 selects the setting for performing printing in the monochrome mode also for a fax printing job. With this setting selected, printing will be performed in the circulation mode in which only the black ink is circulated.

In S902, the print controller 202 determines whether the printing based on the obtained job has been completed. If the printing has been completed, the print controller 202 proceeds to S903.

In S903, the print controller 202 determines whether the printing performed in S901 is printing performed in the circulation mode in which only the black ink is circulated. Printing in the monochrome mode uses the black ink and does not use the chromatic color inks. In this case, the black ink is the only ink circulated during the printing in the monochrome mode. Thus, if the printing based on the job in S901 is printing in the monochrome mode, the print controller 202 determines that the printing has been performed in the circulation mode in which only the black ink is circulated, and proceeds to S904.

If the printing has been performed not in the circulation mode in which only the black ink is circulated, e.g., if the printing has been performed in the color mode, in which all-color circulation is performed, the print controller 202 proceeds to S905.

In S904, the print controller 202 obtains the time of the ink circulation performed on the basis of the job obtained this time in S901. The printing apparatus 1 comprises a timer as a measurement unit that counts the time of ink circulation. The print controller 202 uses the timer to record the time of ink circulation in each job. Also, the RAM 204 stores an accumulated time Tksum for which only the black ink has been continuously circulated.

The print controller 202 obtains the accumulated time Tksum, for which only the black ink has been continuously circulated, and adds the time of the ink circulation performed on the basis of the job obtained this time in S901 to the accumulated time Tksum. As a result, the accumulated time Tksum, for which only the black ink has been continuously circulated, is updated, and the updated accumulated time Tksum is stored in the RAM 204.

The chromatic color inks are not circulated in the circulation mode in which only the black ink is circulated. Then, by determining the time for which only the black ink has been circulated, it is possible to determine the accumulated time for which the chromatic color inks have not been circulated. Note that the accumulated time Tksum, for which only the black ink has been continuously circulated, is reset in a case where the chromatic color inks are circulated, as will be described later.

In S905, the print controller 202 checks whether there is a job waiting to be processed next. If there is a waiting job, the print controller 202 determines that there is a next job. If determining that there is no next job, the print controller 202 proceeds to S915. In S915, the print controller 202 ends the ink circulation and ends the processing. Here, the print controller 202 may reset the accumulated time Tksum to 0.

If there is a next job waiting (YES in S905), the print controller 202 proceeds to S906.

In S906, the print controller 202 determines whether the job obtained this time in S901 was a job involving circulation of only the black ink and the waiting job is a job involving all-color circulation. For example, since printing in the color mode uses the inks of all colors (cyan C, magenta M, yellow Y, and black K), a job of performing printing in the color mode is a job involving all-color circulation. Similarly, since printing in the monochrome mode uses only the ink of black K, a job of performing printing in the monochrome mode is a job involving circulation of only the black ink. Thus, the result of the above determination is YES if the job performed this time was a job of performing printing in the monochrome mode and the job to be performed next is a job of performing printing in the color mode.

If the result of the determination in S906 is YES, the circulation mode is to be switched. Thus, in S907, the print controller 202 stops the current ink circulation so that the circulation mode can be switched.

In the present embodiment, the inks of all colors are individually circulated but the pumps for circulating the inks of all colors are driven by a common motor. Thus, in a case of switching from the circulation mode in which only the black ink is circulated to the circulation mode in which all-color circulation is performed, the circulation mode is switched by changing the drive of the motor. For this reason, in a case of switching the circulation mode, the ink circulation is stopped in order to change the drive of the motor. Then, in a case where the current circulation mode does not need to be stopped to switch the circulation mode, e.g., in a case where a motor is provided individually for each circulation mode, the process in S907 may be omitted.

In S908, the print controller 202 starts all-color circulation for the printing in the color mode.

In S909, the print controller 202 obtains Tksum, indicating the accumulated time for which only the black ink has been circulated, from the RAM 204 and determines whether the accumulated time Tksum is shorter than or equal to a predetermined time. In the present embodiment, the predetermined time is 300 seconds and the print controller 202 therefore determines whether the accumulated time Tksum, for which only the black ink has been circulated, is shorter than or equal to 300 seconds. Here, 300 seconds as the predetermined time is an example, and the predetermined time is not limited to this time.

If the accumulated time Tksum is longer than 300 seconds (NO in S909), then in S910 the print controller 202 causes the printing apparatus 1 to wait for a certain time. Specifically, the print controller 202 refers to a table shown in FIG. 11, determines a wait time Tx corresponding to the accumulated time Tksum, and causes the printing apparatus 1 to wait for Tx seconds.

To "wait" is to maintain the state of performing the ink circulation without performing printing operation. Generally, printing is started quickly after performing operation of circulating the ink for the printing. In the present case, however, after circulation operation is started, the ink circulation is performed for Tx seconds in accordance with the table in FIG. 11 before starting printing. By extending the time between the start of the all-color circulation and the start of the printing operation in this manner, the inks of all colors are circulated without performing printing operation. Hence, the thickened inks near the ejection openings for the chromatic color inks, which have not been circulated in the black-ink circulation mode, are collected.

Basically, the chromatic color inks are not circulated during printing in the monochrome mode, in which only the black ink is circulated, in order to prevent concentration of the chromatic color inks in their respective circulation paths. Hence, the length of the accumulated time Tksum of the circulation mode in which only the black ink is circulated is equal to the accumulated time for which the chromatic color inks have not been circulated. The longer the accumulated time for which the chromatic color inks have not been circulated, the greater the extent of thickening of the chromatic color inks near the ejection openings. Thus, as a preparation for performing the printing in the color mode, all-color circulation is performed as preliminary circulation of the chromatic color inks for a certain time corresponding to the accumulated time Tksum, for which the black ink has been circulated.

Note that the table in FIG. 11 is merely an example, and a table in which different accumulated times Tksum and wait times Tx are associated with each other may be used. As shown in FIG. 11, the table shows that the wait time Tx, indicating the time of all-color circulation before printing, generally increases as the accumulated time Tksum, for which the black ink has been circulated, increases. As mentioned above, the longer the time for which the black ink has been circulated, the longer the accumulated time for which the chromatic color inks have not been circulated. The longer the time for which an ink in its circulation path has not been circulated, the greater the extent of thickening of the ink near the ejection openings. Thus, the wait time Tx is set to be longer as the accumulated time Tksum becomes longer so that the inks will be circulated for a longer time to eliminate the inks that have become thickened to a greater extent.

The table in FIG. 11 is stored in the ROM 203 in advance, and the print controller 202 is capable of referring to the table at any time. Instead of the table, a mathematical equation in which the accumulated time Tksum can be plugged in may be used to determine the wait time Tx.

After the printing apparatus 1 waits for Tx seconds in S910 or if the accumulated time Tksum is shorter than or equal to 300 seconds (YES in S909), the print controller 202 proceeds to S911.

In S911, the print controller 202 resets the accumulated time Tksum and stores 0 as Tksum. Specifically, the accumulated time Tksum is reset since all inks will be circulated in the next job.

On the other hand, if the job obtained this time in S901 was not a job involving the circulation mode in which only the black ink is circulated, or the circulation mode involved in the waiting job is not the circulation mode in which all-color circulation is performed (NO in S906), the print controller 202 proceeds to S912.

In S912, the print controller 202 determines whether the job performed this time in S901 was a job involving all-color circulation and the waiting job is a job involving circulation of only the black ink. For example, the result of the above determination is YES if the job performed this time was a job of performing printing in the color mode and the job to be performed next is a job of performing printing in the monochrome mode.

If the result of the determination is YES, the print controller 202 proceeds to S913. Like the process in S907, the process in S913 stops the circulation so that the circulation mode can be switched.

In S914, the print controller 202 starts circulating the black ink for the printing with the black ink. In the present case, the circulation mode involved in the job performed this time was all-color circulation, and therefore none of the inks remained uncirculated in the job performed this time. For this reason, the print controller 202 returns to S901 and starts the printing without providing any wait time.

On the other hand, NO in S912 means that the color of the circulated ink(s) is the same in the job processed this time in S901 and the next waiting job. For this reason, it is not necessary to collect thickened ink(s) near the ejection openings, and the print controller 202 therefore returns to S901 and starts the printing.

As described above, according to the present embodiment, even in a case where a job involving no circulation of the chromatic color inks such as printing in the monochrome mode is performed for a predetermined time, the thickened inks present near the ejection openings for the chromatic color inks are collected before printing operation with the chromatic color inks is performed. Thus, it is possible to suppress concentration of inks which are not used in printing operation by not circulating the inks during the printing operation, and also prevent ejection failure due to the uncirculated inks.

Second Embodiment

The present embodiment involves performing the processing described in the first embodiment and in addition performing all-color circulation after a job involving no circulation of the chromatic color inks is finished in a case where the job is performed for a predetermined time. Performing all-color circulation when the printing operation is finished eliminates the need to perform maintenance for restoring the ejection openings for the chromatic color inks (the preliminary circulation operation described in the first embodiment) in an occasion where a print job in the color mode is obtained as a next job.

Figures 12, 12A:
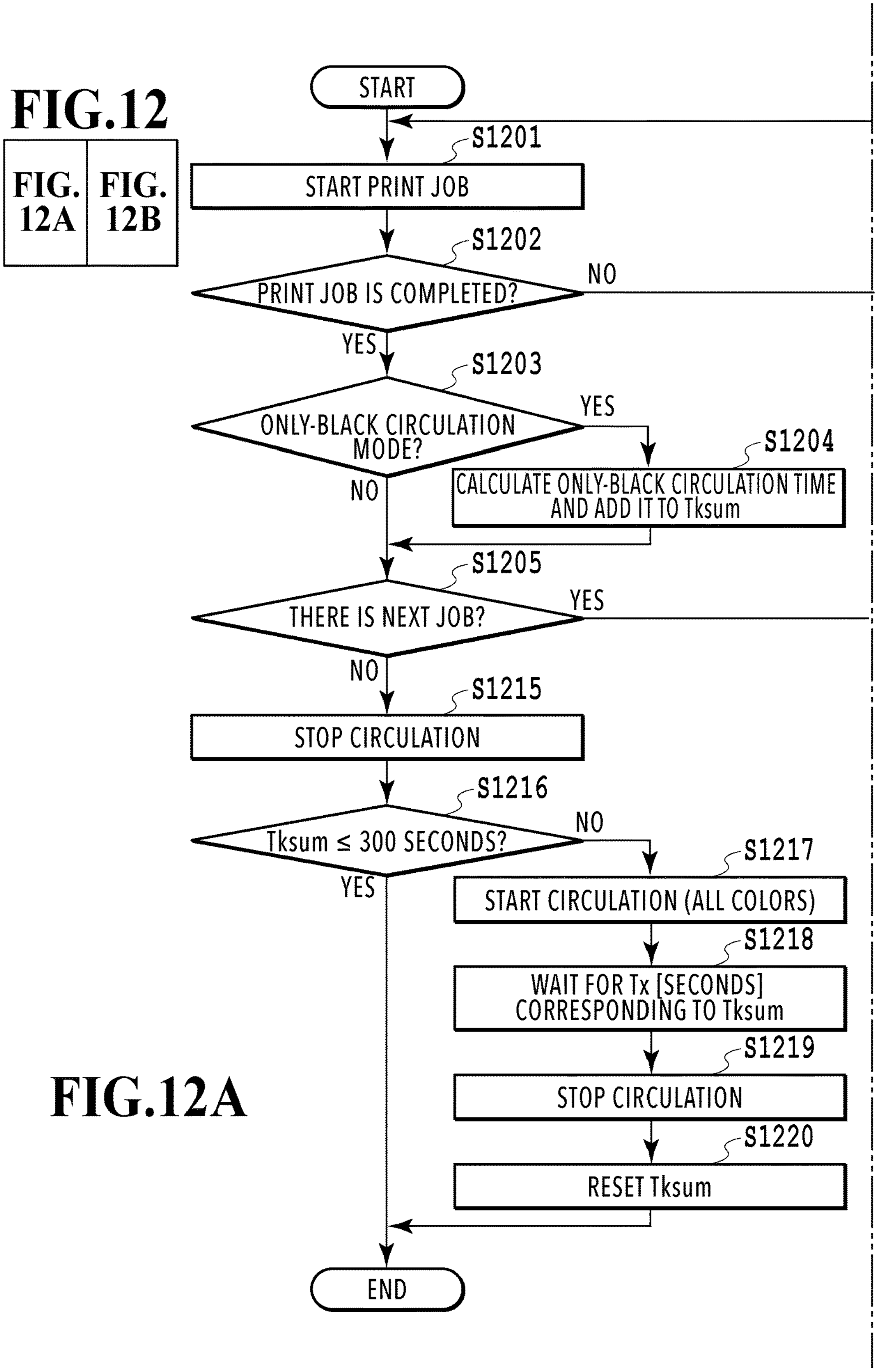
FIG. 12 is a diagram showing the relationship of FIG. 12A and FIG. 12B.
FIG. 12A is a flowchart showing processing involving performing all-color circulation according to a circulation time.
Figure 12B:
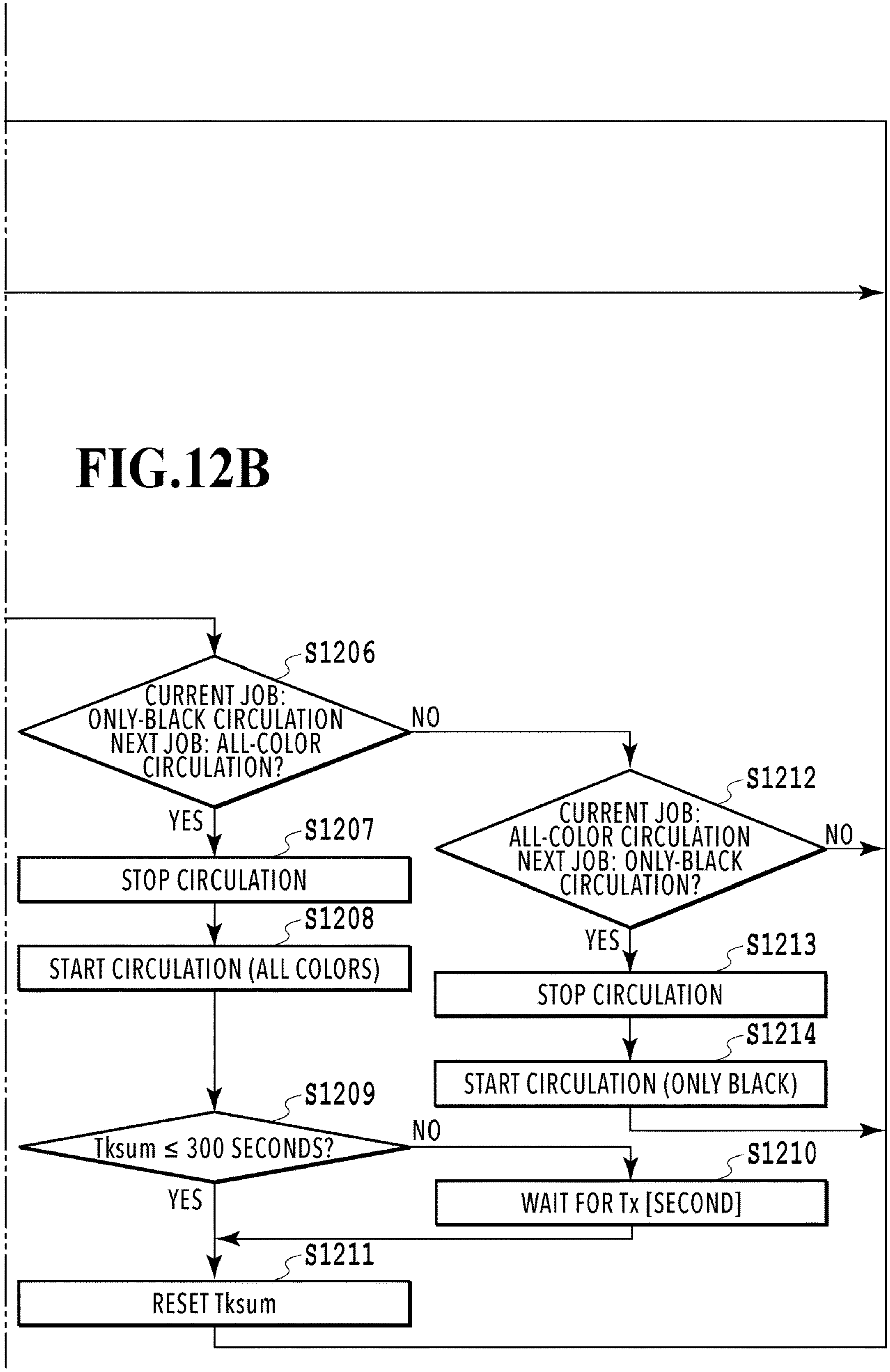
FIG. 12B is a flowchart showing processing involving performing all-color circulation according to a circulation time.

In the present embodiment, its difference from the first embodiment will be mainly described. Features that are not particularly specified are the same components and processes as those in the first embodiment. FIG. 12 is a flowchart showing the processing in the present embodiment.

S1201 to S1204 are the same processes as S901 to S904, and description thereof is therefore omitted. The processes in S1206 to S1214 are also the same as the processes in the S906 to S914, and description thereof is therefore omitted.

In S1205, the print controller 202 checks whether there is a job waiting. If there is a waiting job, the print controller 202 determines that there is a next job. If determining that there is no next job, the print controller 202 proceeds to S1215.

The subsequent processes in S1215 to S1220 are processes for performing all-color circulation in advance even without any job waiting to prepare for a case where a job to be obtained next by the print controller 202 involves the color mode. Specifically, there is a case where a job involving circulation of the black ink is finished and there is no next job waiting (NO in S1205). In this case, no printing will be performed, and the print controller 202 therefore stops the ink circulation (S1215). Here, if the accumulated time Tksum, for which the black ink has been circulated, is longer than a predetermined value (NO in S1216), the print controller 202 performs all-color circulation according to the accumulated time Tksum, for which the black ink has been circulated, without performing printing operation (S1217). Performing all-color circulation in advance as described above removes the thickened inks near the ejection openings for the chromatic color inks. Hence, even in a case where the job to be obtained next by the print controller 202 is a job of performing printing in the color mode, there is no need to perform processing for maintenance of the ejection openings for ejecting the chromatic color inks.

S1216, S1217, S1218, and S1220 are the same processes as S909, S908, S910, and S911, respectively, and description of these individual processes are therefore omitted.

Note that while the print controller 202 ends the processing if the accumulated time Tksum is shorter than or equal to 300 seconds in S1216, the print controller 202 may reset the accumulated time Tksum to 0 and end the processing.

As described above, according to the present embodiment, the thickened inks near the ejection openings for the chromatic color inks are collected to prepare for a case where the job to be obtained next by the print controller 202 is a print job in the color mode. Hence, there is no need to perform maintenance for restoring the ejection openings for the chromatic color inks in an occasion where the next job is obtained.

OTHER EMBODIMENTS

In the foregoing embodiments, the print controller 202 performs the series of processes, but the main controller 101 may perform the processes.

In the description of the foregoing embodiments, the ink colors used in the printing apparatus 1 are black ink K and chromatic color inks (cyan C, magenta M, and yellow Y), but the ink colors are not limited to this example. For example, there may be a plurality of types of black inks K (K1, K2), and the ink K1 may be included as a chromatic color ink. Moreover, the foregoing embodiments are applicable also to a printing apparatus equipped with a plurality of inks and operates in a first mode using a first ink and in a second mode using the plurality of inks including the first ink.

In the foregoing embodiments, only the black ink is circulated during printing in the monochrome mode. Then, the time of printing operation in the monochrome mode can be considered equivalent to the time for which only the black ink is circulated. Hence, the print controller 202 may be configured to determine the accumulated time Tksum on the basis of the time of printing in the monochrome mode.

In the foregoing embodiments, a predetermined time or the wait time Tx is determined on the basis of the accumulated time Tksum, for which the black ink has been circulated. Besides this, the accumulated time for which the chromatic color inks have not been circulated may be measured, and this accumulated time may be used as a time to determine the predetermined time or the wait time Tx in the foregoing embodiments.

In the foregoing embodiments, there are two circulation modes, namely, the black-ink circulation mode and the all-color circulation mode, but a circulation mode may be provided for each type of ink. In this case, the ink circulation performed to collect thickened ink near ejection openings may be circulation of only the chromatic color inks, excluding the black ink, instead of all-color circulation.

Alternatively, the print controller 202 may measure the time for which ink circulation is not performed for each type of ink, and determine the accumulated time for which ink circulation has not been performed for each type of ink. In a case where the above accumulated time for a type of ink is longer than the predetermined time and printing is to be performed with that type of ink, the print controller 202 may select the type of ink as a target ink to be circulated before the printing operation on the basis of the accumulated time for which the type of ink has not been circulated, and circulate the target ink.

For example, in S904, the print controller 202 manages the accumulated time for which ink circulation has not been performed for each type of ink. Also, in the determination in S906, the print controller 202 determines whether there is any type of ink that was not circulated in the job performed this time among the types of inks to be circulated in the processing of the waiting job.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-189939, filed Oct. 5, 2018, which is hereby incorporated by reference herein in its entirety.

What is claimed is:

1. A printing apparatus comprising:

a print unit comprising, for each of a plurality of types of inks including a first type and a second type, an ejection opening from which an ink can be ejected, the print unit being configured to perform a printing operation by ejecting the ink from the ejection opening to a printing medium; and a circulation unit capable of circulating ink of the first type and ink of the second type, wherein the circulation unit starts circulating ink of the first type at a first timing and starts circulating ink of the second type at a second timing which is different from the first timing, and wherein in a case where printing is performed in a mode of using ink of the second type after printing in a mode of using ink of the first type and not using ink of the second type, (1) the circulation unit starts circulating ink of the second type between an end of printing in the mode of using ink of the first type and not using ink of the second type and a start of printing in the mode of using ink of the second type, (2) the circulation unit circulates ink of the second type simultaneously with circulation of ink of the first type, and (3) the circulation unit continues circulating ink of the second type simultaneously with circulation of ink of the first type during printing in the mode of using ink of the second type started afterward.

2. The printing apparatus according to claim 1, wherein in a case where the printing operation is a printing operation in the mode of using ink of the first type and not using ink of the second type, the circulation unit does not circulate ink of the second type during the printing operation.

3. The printing apparatus according to claim 2, wherein in a case where the printing operation is a printing operation in the mode of using ink of the first type and not using ink of the second type, the circulation unit circulates ink of the first type during the printing operation.

4. The printing apparatus according to claim 1, wherein in a case where the printing operation is a printing operation in the mode of using ink of the second type, the circulation unit circulates ink of the second type during the printing operation.

5. The printing apparatus according to claim 1, wherein the first timing is earlier than the second timing.

6. The printing apparatus according to claim 1, wherein in a case where the printing operation is a printing operation in the mode of using ink of the first type and not using ink of the second type, the circulation unit starts circulating ink of the second type after the printing operation is finished.

7. The printing apparatus according to claim 1, wherein ink of the first type is a black ink.

8. The printing apparatus according to claim 7, wherein the ink of the second type is a chromatic color ink, wherein in a case where a monochrome mode of using the black ink and not using the chromatic color ink in the printing operation is selected, the circulation unit circulates the black ink and does not circulate the chromatic color ink while the printing operation is performed, wherein in a case where a color mode of using the black ink and the chromatic color ink in the printing operation is selected, the circulation unit circulates the black ink and the chromatic color ink while the printing operation is performed, and wherein in a case where an automatic mode of using the black ink and the chromatic color ink in the printing operation is selected, the circulation unit circulates the black ink and the chromatic color ink while the printing operation is performed.

9. The printing apparatus according to claim 1, wherein ink of the second type is a chromatic color ink.

10. The printing apparatus according to claim 1, wherein the circulation unit circulates ink of the first type through the print unit.

11. The printing apparatus according to claim 10, wherein the print unit further comprises, for each of the plurality of types of inks, (a) a printing element for generating energy used for ejecting ink corresponding to the ejection opening and (b) a pressure chamber which is an area facing to the printing element, wherein the ejection opening ejects ink supplied in the pressure chamber, and wherein the circulation unit circulates ink of the first type from the outside of the pressure chamber to the inside of the pressure chamber and from the inside of the pressure chamber to the outside of the pressure chamber by supplying ink such that the ink flows from a first flow path, the first flow path being for supplying ink to the pressure chamber, to a second flow path, the second flow path being communicated with the pressure chamber and being different from the ejection opening and the first flow path.

12. The printing apparatus according to claim 11, wherein the circulation unit circulates ink of the second type from the outside of the pressure chamber to the inside of the pressure chamber and from the inside of the pressure chamber to the outside of the pressure chamber by supplying ink such that the ink flows from a third flow path, the third flow path being for supplying ink to the pressure chamber, to a fourth flow path, the fourth flow path being communicated with the pressure chamber and being different from the ejection opening and the third flow path.

13. The printing apparatus according to claim 10, wherein the circulation unit circulates ink of the second type through the print unit.

14. The printing apparatus according to claim 1, further comprising:

a first tank configured to store ink of the first type to be supplied to the print unit; and a first supply flow path configured to flow ink of the first type from the first tank to the print unit, wherein the circulation unit circulates ink of the first type through at least a part of the first supply flow path.

15. The printing apparatus according to claim 14, further comprising:

a second tank configured to store ink of the second type to be supplied to the print unit; and a second supply flow path configured to flow ink of the second type from the second tank to the print unit, wherein the circulation unit circulates ink of the second type through at least a part of the second supply flow path.

16. The printing apparatus according to claim 1, wherein the print unit comprises (a) a print unit configured to eject ink of the first type and (b) a print unit configured to eject ink of the second type.

17. The printing apparatus according to claim 1, wherein the circulation unit circulates at least the ink of the second type after the printing operation in a case where a time for which the ink of the second type is not circulated is a first time, and wherein the circulation unit does not circulate the ink of the second type after the printing operation in a case where a time for which the ink of the second type is not circulated is a second time that is shorter than the first time.

18. A method of controlling a printing apparatus, the printing apparatus comprising (a) a print unit comprising, for each of a plurality of types of inks including a first type and a second type, an ejection opening from which an ink can be ejected, the print unit being configured to perform a printing operation by ejecting the ink from the ejection opening to a printing medium, and (b) a circulation unit capable of circulating ink of the first type and ink of the second type, the method comprising:

controlling the circulation unit to start circulating ink of the first type at a first timing and to start circulating ink of the second type at a second timing which is different from the first timing, wherein the controlling comprises, in a case where printing is performed in a mode of using ink of the second type after printing in a mode of using ink of the first type and not using ink of the second type, (1) causing the circulation unit to start circulating ink of the second type between an end of printing in the mode of using ink of the first type and not using ink of the second type and a start of printing in the mode of using ink of the second type, (2) causing the circulation unit to circulate ink of the second type simultaneously with circulation of ink of the first type, and (3) causing the circulation unit to continue circulating ink of the second type simultaneously with circulation of ink of the first type during printing in the mode of using ink of the second type started afterward.

19. The method according to claim 18, further comprising:

in a case where the printing operation is a printing operation in the mode of using ink of the first type and not using ink of the second type, controlling the circulation unit not to circulate ink of the second type during the printing operation.

20. The method according to claim 19, further comprising:

in a case where the printing operation is a printing operation in the mode of using ink of the first type and not using ink of the second type, controlling the circulation unit to circulate ink of the first type during the printing operation.

21. The method according to claim 18, further comprising:

in a case where the printing operation is a printing operation in the mode of using ink of the second type, controlling the circulation unit to circulate ink of the second type during the printing operation.

22. The method according to claim 18, wherein the first timing is earlier than the second timing.

23. The method according to claim 18, further comprising:

in a case where the printing operation is a printing operation using ink of the first type and not using ink of the second type, controlling the circulation unit to start circulating ink of the second type after the printing operation is finished.

24. The method according to claim 18, wherein ink of the first type is a black ink.

25. The method according to claim 18, wherein ink of the second type is a chromatic color ink.

* * * * *